US009749520B2

(12) United States Patent
Okazawa

(10) Patent No.: US 9,749,520 B2
(45) Date of Patent: Aug. 29, 2017

(54) IMAGING DEVICE AND IMAGE PROCESSING METHOD

(71) Applicant: Olympus Corporation, Hachioji-shi, Tokyo (JP)

(72) Inventor: Atsuro Okazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/132,919

(22) Filed: Apr. 19, 2016

(65) Prior Publication Data

US 2016/0234428 A1 Aug. 11, 2016

Related U.S. Application Data

(63) Continuation of application No. PCT/JP2015/059163, filed on Mar. 25, 2015.

(30) Foreign Application Priority Data

Jul. 2, 2014 (JP) .................................. 2014-136976

(51) Int. Cl.
*H04N 5/232* (2006.01)
*G06T 3/40* (2006.01)
(Continued)

(52) U.S. Cl.
CPC ....... *H04N 5/23212* (2013.01); *G06T 3/4007* (2013.01); *H04N 5/347* (2013.01);
(Continued)

(58) Field of Classification Search
CPC .... H04N 5/23212; H04N 9/045; H04N 5/347; H04N 5/3696; H04N 9/077; G06T 3/4007
See application file for complete search history.

(56) References Cited

U.S. PATENT DOCUMENTS

| | | | |
|---|---|---|---|
| 8,224,116 B2 * | 7/2012 | Hiraga | ...................... G06T 7/13 |
| | | | 382/260 |
| 2009/0214132 A1 * | 8/2009 | Yamada | ............... G06K 9/4609 |
| | | | 382/266 |

(Continued)

FOREIGN PATENT DOCUMENTS

| | | |
|---|---|---|
| JP | 2000-156823 | 6/2000 |
| JP | 2010-062640 | 3/2010 |

(Continued)

OTHER PUBLICATIONS

International Search Report to corresponding International Application No. PCT/JP2015/059163, mailed on Jun. 23, 2015 (2 pgs.), with translation (1 pg.).

(Continued)

*Primary Examiner* — Padma Haliyur
(74) *Attorney, Agent, or Firm* — John C. Pokotylo; Straub & Pokotylo

(57) ABSTRACT

An imaging device includes an imaging element, a weight calculating section, and an interpolation processing section. The imaging element includes normal pixels and functional pixels, the functional pixels being arranged at nonuniform intervals in a first direction. The weight calculating section calculates a first weight and a second weight, the second weight being smaller than the first weight. The interpolation processing section performs pixel interpolation to interpolate the pixel value of each of the functional pixels based on the pixel values obtained by the peripheral normal pixels where the first weight and the second weight are applied to a pixel value obtained by each of the normal pixels arranged in the first direction and a direction different from the first direction, respectively.

9 Claims, 27 Drawing Sheets

(51) Int. Cl.
*H04N 9/077* (2006.01)
*H04N 5/347* (2011.01)
*H04N 5/369* (2011.01)
*H04N 9/04* (2006.01)

(52) U.S. Cl.
CPC .......... *H04N 5/3696* (2013.01); *H04N 9/045* (2013.01); *H04N 9/077* (2013.01)

(56) References Cited

U.S. PATENT DOCUMENTS

| | | | | |
|---|---|---|---|---|
| 2011/0285899 A1* | 11/2011 | Hirose | ............... | G02B 7/34 348/360 |
| 2013/0107067 A1* | 5/2013 | Miyakoshi | ......... | H04N 5/23212 348/208.5 |
| 2014/0043508 A1 | 2/2014 | Kawamura et al. | | |
| 2015/0062374 A1* | 3/2015 | Okazawa | ............. | G02B 7/34 348/229.1 |
| 2015/0103210 A1* | 4/2015 | Inoue | ............... | G02B 7/346 348/239 |
| 2015/0124129 A1 | 5/2015 | Aoki et al. | | |
| 2015/0156405 A1 | 6/2015 | Izawa | | |
| 2015/0365639 A1* | 12/2015 | Ogawa | ............. | H04N 5/3675 348/272 |

FOREIGN PATENT DOCUMENTS

| | | |
|---|---|---|
| WO | WO 2012/127699 | 9/2012 |
| WO | WO 2014/006785 | 1/2014 |
| WO | WO 2014/046037 | 3/2014 |

OTHER PUBLICATIONS

Written Opinion of the International Searching Authority to International Patent Application No. PCT/JP2015/059163, mailed on Jun. 23, 2015 (3 pgs.).

English translation of International Preliminary Report on Patentability to corresponding International Application No. PCT/JP2015/059163, mailed on Jun. 12, 2017 (6 pgs.).

* cited by examiner

FIG. 2

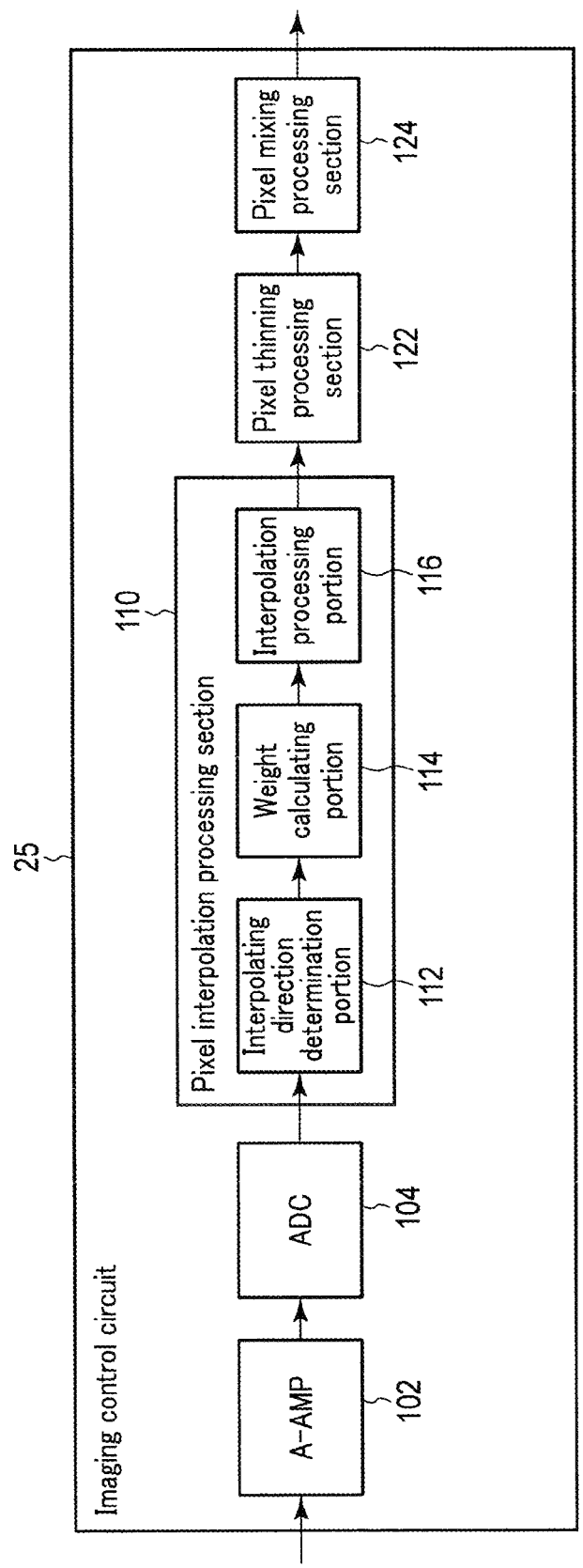
F I G. 4

FIG. 6A

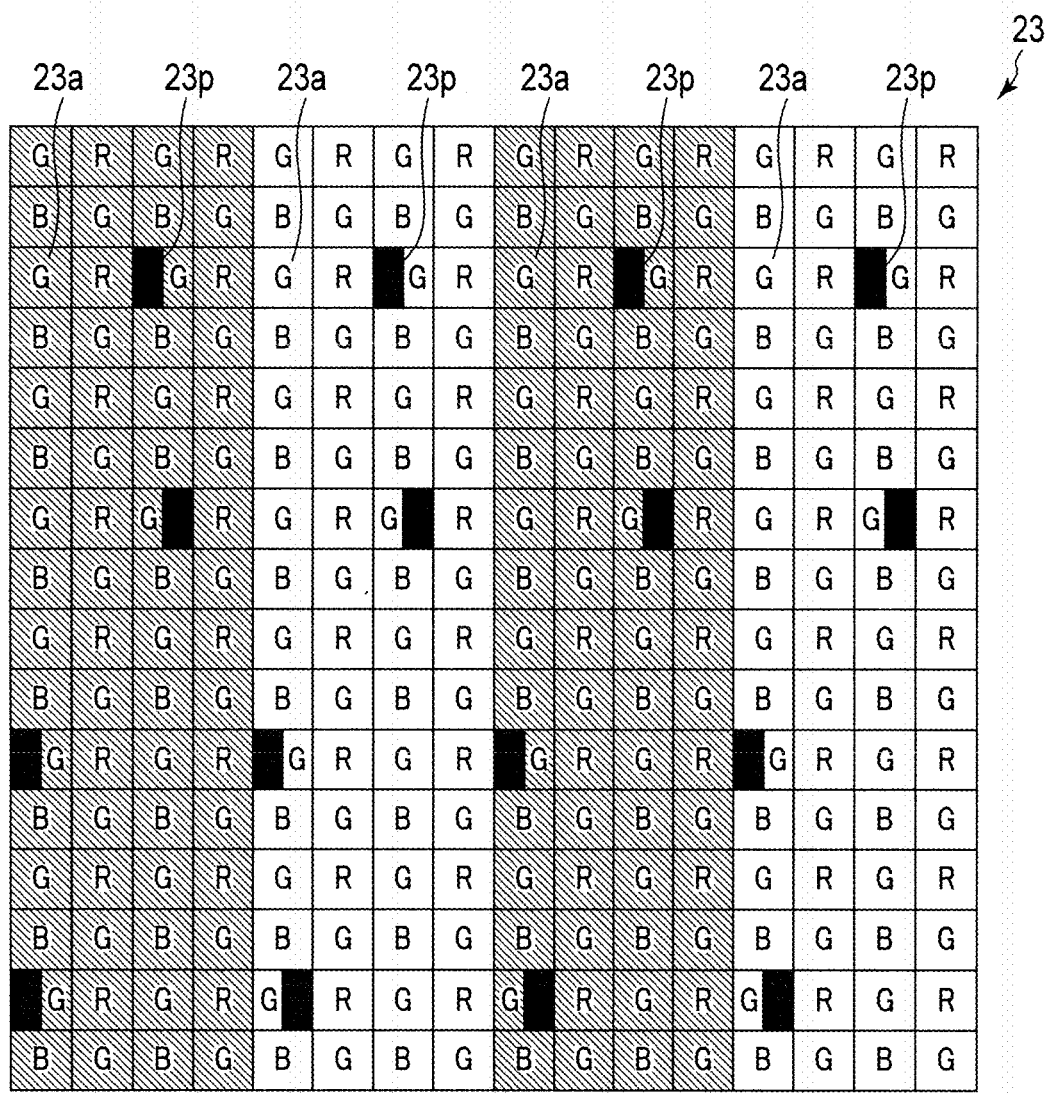
F I G. 7A

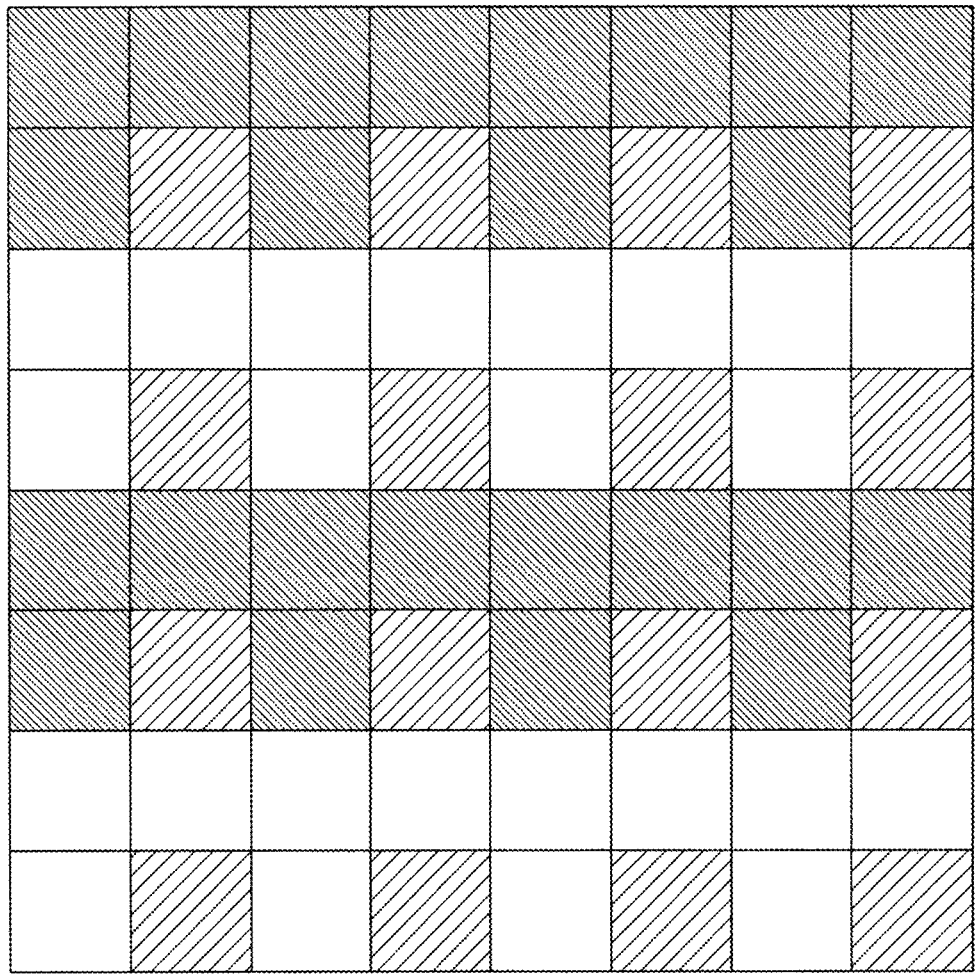
F I G. 9C

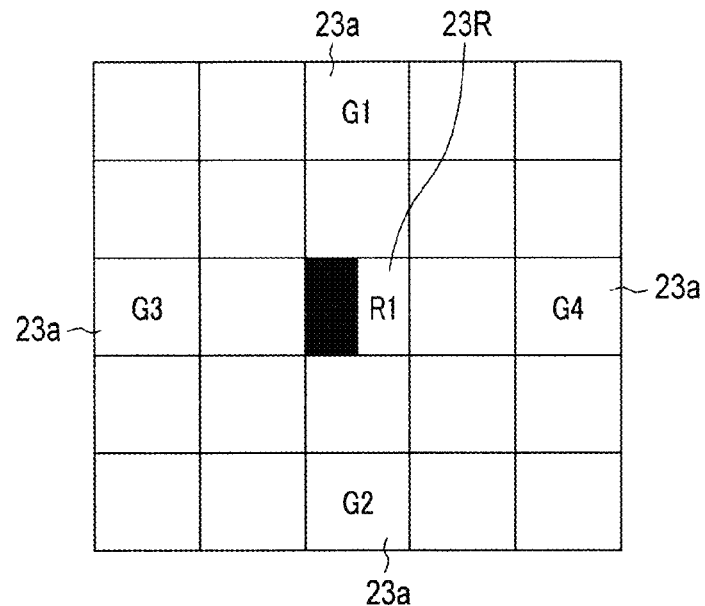
F I G. 13A
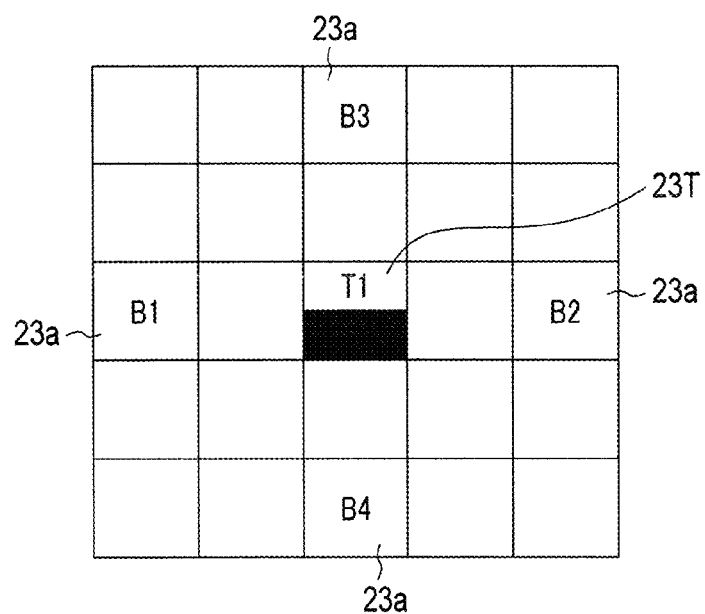
F I G. 13B

IMAGING DEVICE AND IMAGE PROCESSING METHOD

CROSS-REFERENCE TO RELATED APPLICATIONS

This application is a Continuation application of PCT Application No. PCT/JP2015/059163, filed Mar. 25, 2015 and based upon and claiming the benefit of priority from prior Japanese Patent Application No. 2014-136976, filed Jul. 2, 2014, the entire contents of all of which are incorporated herein by reference.

BACKGROUND OF THE INVENTION

1. Field of the Invention

The present invention relates to an imaging device and an image processing method.

2. Description of the Related Art

As to an imaging element which converts an optical image formed by an optical system into an electric signal, there is known an imaging element including pixels which output signals for focus detection. For example, in Jpn. Pat. Appln. KOKAI Publication No. 2000-156823, there is disclosed a technology concerned with an imaging element in which part of light receiving surfaces of pixels is shielded to perform a distance measuring function by phase difference system to some of the pixels. Information acquired by such phase difference pixels having the distance measuring function is for use in, for example, autofocus processing to set the optical system to a focused state.

Phase difference detecting pixels are preferably disposed on the whole surface of the imaging element so that a subject of any frequency can exactly be focused. However, when a large number of the phase difference detecting pixels are disposed, the number of the pixels for imaging remarkably decrease, and thus, remarkable deterioration of an image quality occurs. Therefore, there has been suggested a system to discretely arrange the phase difference detecting pixels.

In a method of discretely arranging the phase difference detecting pixels, to detect phase differences of all frequencies, for example, it is suitable that the pixels are arranged so that spaces in a vertical direction are eliminated as much as possible to detect horizontal lines. Therefore, there has been suggested a contrivance to arrange the phase difference detecting pixels in a high density by making stepped portions therein, in a direction different from a phase difference detecting direction.

Outputs of the phase difference detecting pixels are not usable as image data as they are. Therefore, it is necessary to correct output values. Thus, it is considered that the output value of each phase difference detecting pixel is corrected with output values of its peripheral pixels. Here, when the output value of the phase difference detecting pixel is simply corrected on the basis of an average of the output values of the peripheral pixels, the deterioration of the image quality might occur. In particular, when the stepped portions are made to arrange the phase difference detecting pixels, an irregular pattern is generated.

On the other hand, for example, in Jpn. Pat. Appln. KOKAI Publication No. 2010-062640, a correcting method as mentioned below is disclosed. That is, on the basis of a standard deviation of values output from peripheral pixels of each phase difference detecting pixel, it is determined whether or not components are high frequency components, and a utilization ratio between an output value of each phase difference detecting pixel and the output value of its peripheral pixel is adjusted. Additionally, when an algorithm in which a filter coefficient is adaptively adjusted in accordance with the values of the peripheral pixels is used in this manner, there is the tendency that a circuit scale increases and power consumption increases.

BRIEF SUMMARY OF THE INVENTION

According to an aspect of the invention, an imaging device includes an imaging element including pixels which are two-dimensionally arranged, the pixels including normal pixels for imaging and functional pixels having a function other than the imaging, the functional pixels being arranged at nonuniform intervals in a first direction; a memory section in which an arrangement of the functional pixels in the imaging element is recorded; an interpolating direction determination section which acquires direction information concerning the first direction based on the arrangement of the functional pixels acquired from the memory section; a weight calculating section which calculates a first weight and a second weight based on the arrangement of the functional pixels acquired from the memory section, the first weight being a weighting amount in the first direction, the second weight being at least one weighting amount in a direction different from the first direction, and the second weight being smaller than the first weight; and an interpolation processing section which performs pixel interpolation to interpolate a pixel value of each of the functional pixels based on pixel values obtained by the peripheral normal pixels of the functional pixel concerning image data obtained in the imaging element where the first weight is applied to the pixel value obtained by each of the normal pixels arranged in the first direction and the second weight is applied to the pixel value obtained by each of the normal pixels arranged in the direction different from the first direction.

According to an aspect of the invention, an image processing method to be applied to image data obtained by using an imaging element including pixels which are two-dimensionally arranged, the pixels including normal pixels for imaging and functional pixels having a function other than the imaging, the functional pixels being arranged at nonuniform intervals in a first direction, the method includes acquiring direction information concerning the first direction based on an arrangement of the functional pixels acquired from a memory section in which the arrangement of the functional pixels in the imaging element is recorded; calculating a first weight and a second weight based on the arrangement of the functional pixels acquired from the memory section, the first weight being a weighting amount in the first direction, the second weight being at least one weighting amount in a direction different from the first direction, and the second weight being smaller than the first weight; and performing pixel interpolation to interpolate a pixel value of each of the functional pixels based on pixel values obtained by the peripheral normal pixels of the functional pixel concerning image data obtained in the imaging element where the first weight is applied to the pixel value obtained by each of the normal pixels arranged in the first direction and the second weight is applied to the pixel value obtained by each of the normal pixels arranged in the direction different from the first direction.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing an outline of a configuration example of an imaging element according to the embodiment;

FIG. 4 is a block diagram showing an outline of a configuration example of an imaging control circuit according to the embodiment;

FIG. 6A is a diagram showing an outline of a configuration example of the imaging element according to the embodiment, and showing an arrangement example of left opening phase difference detecting pixels and right opening phase difference detecting pixels;

FIG. 7A is a diagram to explain pixel interpolation, and a schematic view showing an outline of a subject image;

FIG. 7B is a diagram to explain the pixel interpolation, and a schematic view to explain that the interpolation is performed by using pixel values of normal pixels adjacent to the left opening phase difference detecting pixels or the right opening phase difference detecting pixels in a horizontal direction;

FIG. 8A is a diagram to explain the pixel interpolation, and a schematic view to explain that the interpolation is performed by using pixel values of normal pixels adjacent to the left opening phase difference detecting pixels or the right opening phase difference detecting pixels in a vertical direction;

FIG. 9A is a diagram to explain the pixel interpolation, and a schematic view showing an outline of the subject image;

FIG. 9B is a diagram to explain the pixel interpolation, and a schematic view showing that the interpolation is performed by using the pixel values of the normal pixels adjacent to the left opening phase difference detecting pixels or the right opening phase difference detecting pixels in the vertical direction;

FIG. 9C is a diagram to explain the pixel interpolation, and a schematic view showing an outline of an image that can be obtained in a case where the interpolation is performed by using the pixel values of the normal pixels adjacent in the vertical direction;

FIG. 10B is a diagram to explain the pixel interpolation, and a schematic view to explain that the interpolation is performed by using pixel values of normal pixels adjacent to the upper opening phase difference detecting pixels or the lower opening phase difference detecting pixels in the vertical direction;

FIG. 12A is a diagram to explain the pixel interpolation, and a schematic view showing an outline of the subject image;

FIG. 12B is a diagram to explain the pixel interpolation, and a schematic view to explain that the interpolation is performed by using the pixel values of the normal pixels adjacent to the upper opening phase difference detecting pixels or the lower opening phase difference detecting pixels in the horizontal direction;

FIG. 13A is a diagram to explain the pixel interpolation of the right opening phase difference detecting pixel;

FIG. 13B is a diagram to explain the pixel interpolation of the upper opening phase difference detecting pixel;

FIG. 14 is a diagram showing an outline of a configuration example of the imaging element according to the embodiment, and a schematic view showing one example of an arrangement of functional pixels;

FIG. 15A is a diagram to explain pixel addition; and

FIG. 15B is a diagram to explain the pixel addition.

DETAILED DESCRIPTION OF THE INVENTION

Figure 1:
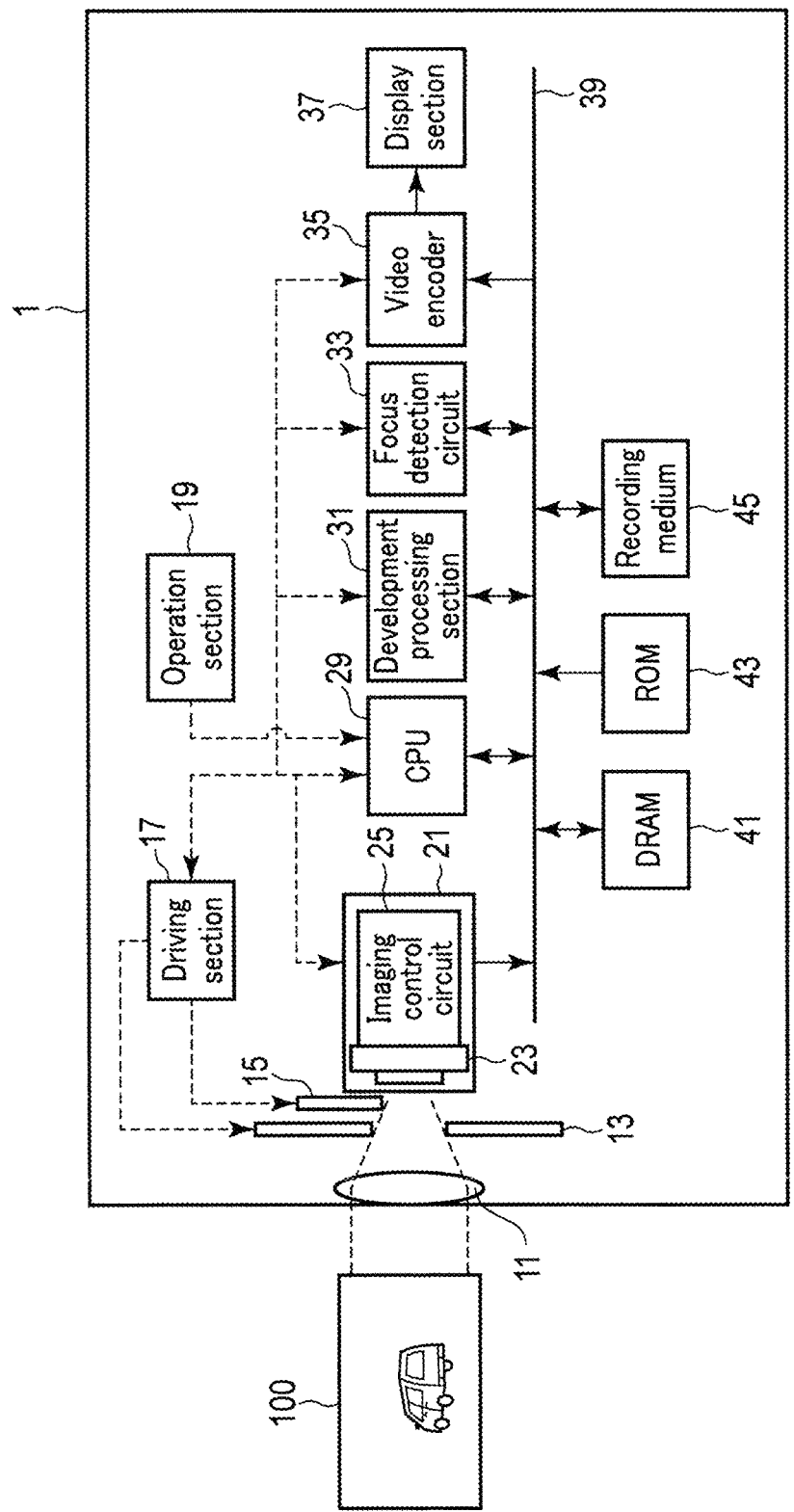
FIG. 1 is a block diagram showing an outline of a configuration example of an imaging device according to an embodiment of the present invention.

An embodiment of the present invention will be described with reference to the drawings. FIG. 1 is a block diagram showing a configuration of a digital camera 1 as one example of an imaging device according to an embodiment of the present invention. In FIG. 1, a solid line with arrows shows a flow of data, and a dashed line with arrows shows a flow of a control signal.

The digital camera 1 shown in FIG. 1 has an imaging lens 11, an aperture 13, a mechanical shutter 15, a driving section 17, an operation section 19, an imaging section 21 including an imaging element 23 and an imaging control circuit 25, a central processing unit (CPU) 29, a development processing section 31, a focus detection circuit 33, a video encoder 35, a display section 37, a bus 39, a dynamic random access memory (DRAM) 41, a read only memory (ROM) 43, and a recording medium 45.

The imaging lens 11 is an optical system including a single lens or lenses to form an image of a subject 100 on the imaging element 23. The imaging lens 11 may be a prime lens or a zoom lens. The aperture 13 is disposed on an optical axis of the imaging lens 11, and configured so that its aperture diameter is changeable. The aperture 13 limits an amount of a light flux passed through the imaging lens 11 from the subject 100. The mechanical shutter 15 is disposed behind the aperture 13 and is openably/closably configured. An opening time of the mechanical shutter 15 is adjusted to adjust an entering time of the subject light flux coming from the subject 100 to the imaging element 23. That is, the mechanical shutter 15 adjusts an exposure time of the imaging element 23. As the mechanical shutter 15, a known focal plane shutter, a lens shutter or the like can be employed. The driving section 17 performs focus adjustment of the imaging lens 11, aperture diameter changing of the aperture 13 and opening/closing of the mechanical shutter 15 on the basis of the control signal from the CPU 29.

The operation section 19 includes various operation buttons such as a power source button, a release button, a reproduction button and a menu button, and various operating members such as a touch panel and the like. An input into the operation section 19 can be recognized through processing by the CPU 29.

The imaging element 23 is disposed at a position on the optical axis of the imaging lens 11 behind the mechanical shutter 15 at which the subject light flux is formed into the image by the imaging lens 11. The imaging element 23 has a configuration in which photodiodes constituting pixels are two-dimensionally arranged. Each photodiode of the imaging element 23 generates an electric charge corresponding to light intensity to be received. The electric charges generated in the photodiodes are accumulated in a capacitor connected to the respective photodiodes. The electric charge accumulated in this capacitor is read out as an image signal. Here, the imaging element 23 in the present embodiment has different electric charge reading systems. The electric charge accumulated in the imaging element 23 is read out in accordance with the control signal from the imaging control circuit 25.

On a front surface of the photodiode constituting each pixel, for example, a color filter of a Bayer array is disposed. The Bayer array has a line along which R pixels and G (Gr) pixels are alternately arranged and a line along which G (Gb) pixels and B pixels are alternately arranged in a horizontal direction.

Additionally, phase difference detecting pixels are arranged in a part of the imaging element 23 in the present embodiment. That is, in the imaging element 23, the phase difference detecting pixels are disposed in addition to imaging pixels to acquire the image to be recorded or displayed. In the phase difference detecting pixels, different from the other pixels, partial regions are shielded. This phase difference detecting pixel functions as a focus detecting pixel for use in focus detection.

Figure 2:
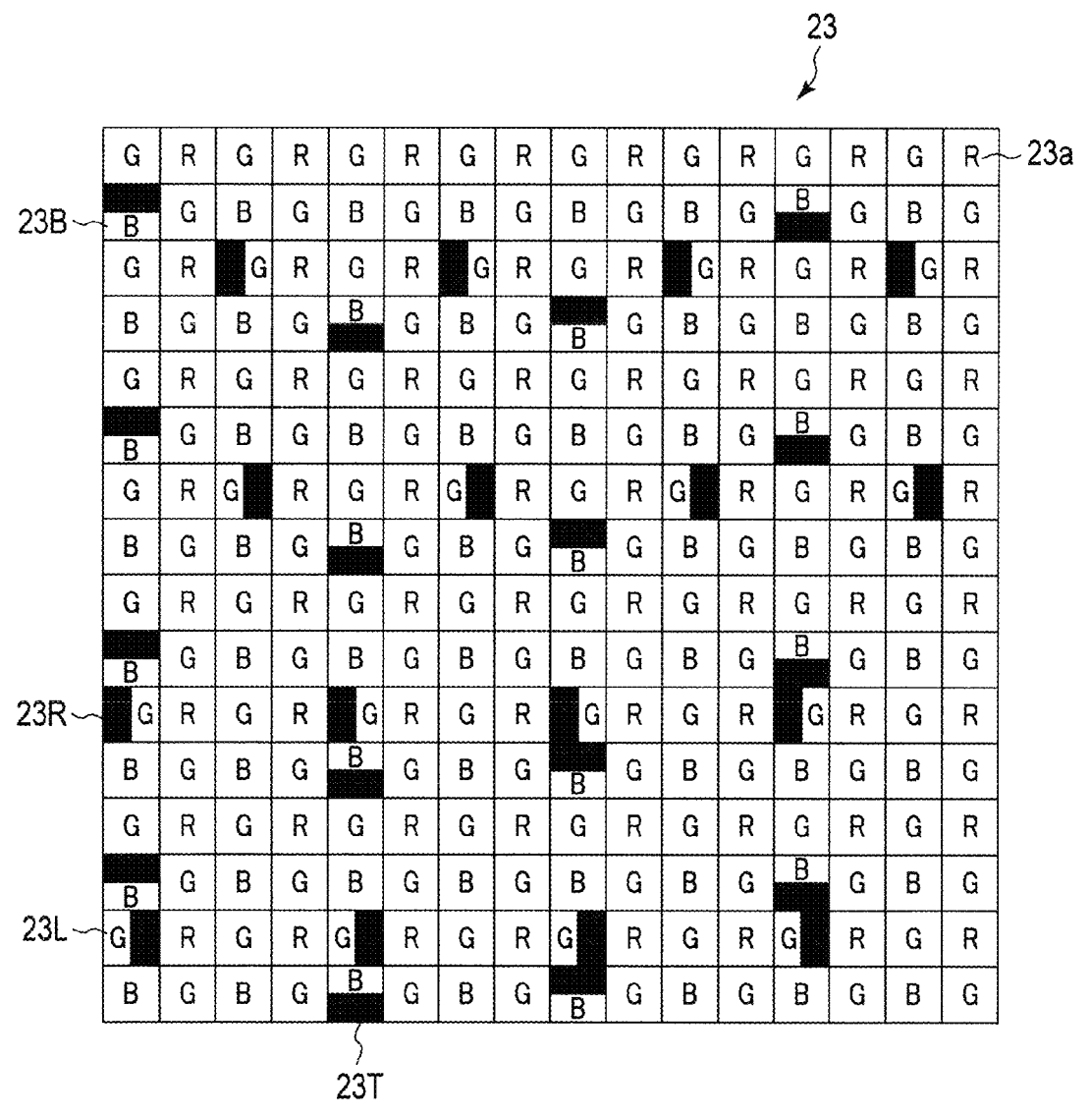

A configuration example of the imaging element 23 will be described with reference to FIG. 2. FIG. 2 is a schematic view showing a pixel array example of the imaging element 23. In FIG. 2, "R" shows the R pixel in which a red color filter is disposed, "G" shows the G pixel in which a green color filter is disposed, and "B" shows the B pixel in which a blue color filter is disposed. Additionally, a blackened region indicates a shielded region. FIG. 2 shows an example of the Bayer array, but a color filter array is not limited to the Bayer array, and various arrays are usable.

As described above, the imaging element 23 of the Bayer array has lines along which the R pixels and the G (Gr) pixels are alternately arranged and lines along which the G (Gb) pixels and the B pixels are alternately arranged in the horizontal direction. In other words, in the imaging element 23 of the Bayer array, sets of four pixels of the Gr pixel, the R pixel, the Gb pixel and B pixel are repeatedly arranged in the horizontal and vertical directions.

In the present embodiment, normal pixels 23a in which the red color filters, the green color filters or the blue color filters are disposed are mixed with phase difference detecting pixels in which light shielding films are disposed. Each phase difference detecting pixel is, for example, a pixel whose upper, lower, right or left region is shielded by the light shielding film. In the example of FIG. 2, there are disposed a right opening phase difference detecting pixel 23R that is a phase difference detecting pixel whose left half surface is shielded, a left opening phase difference detecting pixel 23L that is a phase difference detecting pixel whose right half surface is shielded, a lower opening phase difference detecting pixel 23B that is a phase difference detecting pixel whose upper half surface is shielded, and an upper opening phase difference detecting pixel 23T that is a phase difference detecting pixel whose lower half surface is shielded.

In the case of the imaging element of a high pixel number, an area of an individual pixel decreases, and hence it is considered that about the same image is formed in the closely arranged pixels. Therefore, when the phase difference detecting pixels are arranged as shown in FIG. 2, a phase difference can be detected with a pair of the closely arranged right opening phase difference detecting pixel 23R and left opening phase difference detecting pixel 23L. According to the pair of the right opening phase difference detecting pixel 23R and the left opening phase difference detecting pixel 23L, the phase difference in the horizontal direction can be detected. Similarly, the phase difference can be detected with the pair of the closely arranged lower opening phase difference detecting pixel 23B and upper opening phase difference detecting pixel 23T. According to the pair of the lower opening phase difference detecting pixel 23B and the upper opening phase difference detecting pixel 23T, the phase difference in the vertical direction can be detected.

It is to be noted that a light shielding area does not have to be ½ of a pixel region, as long as a light shielding region has a certain degree of area. Furthermore, in the example shown in FIG. 2, the right opening phase difference detecting pixel 23R and the left opening phase difference detecting pixel 23L are disposed in the Gr pixels, and the lower opening phase difference detecting pixel 23B and the upper opening phase difference detecting pixel 23T are disposed in the B pixels, but these arrangements can suitably be changed.

Additionally, the example of FIG. 2 is an example where pupil splitting is performed by shielding the partial region of the phase difference detecting pixel. However, there is no special restriction on the phase difference detecting pixel, as long as one of a pair of subject light fluxes passed through different pupil regions of the imaging lens 11 can selectively be received. In consequence, a configuration in which the partial region is shielded is not employed, but the pupil splitting may be performed by, for example, a pupil splitting micro lens.

Figure 3A:
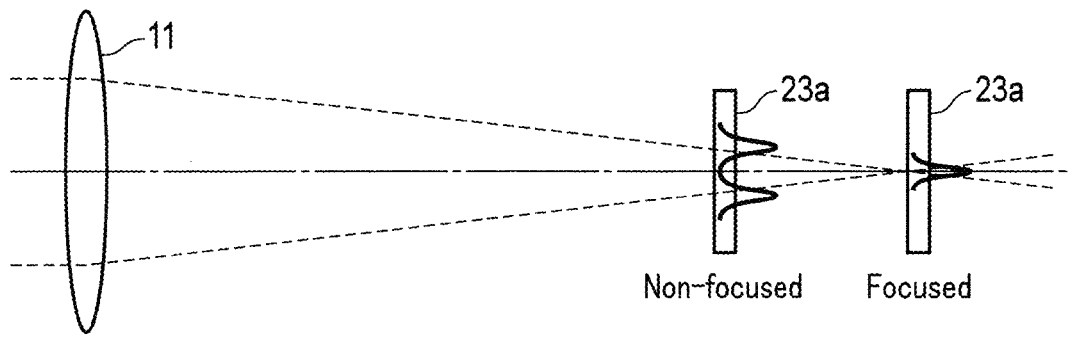
FIG. 3A is a view to explain a principle of focus detection by a phase difference method in which the imaging element according to the embodiment is used.
Figure 3B:
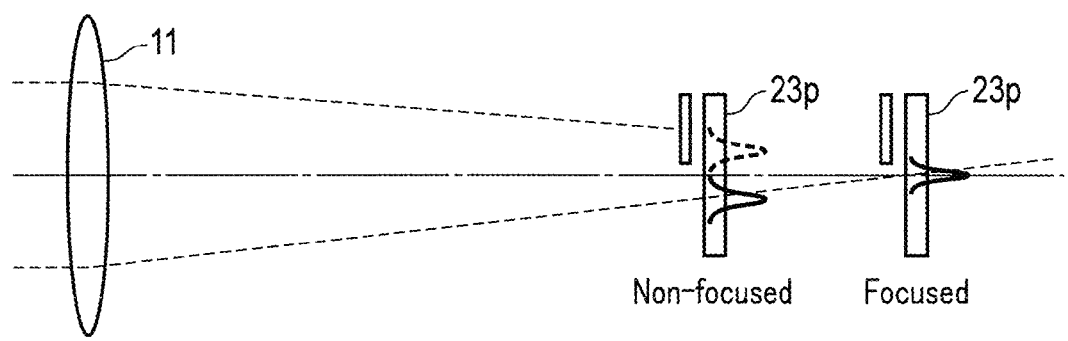
FIG. 3B is a view to explain the principle of the focus detection by the phase difference method in which the imaging element according to the embodiment is used.

A principle of the focus detection by a phase difference method in which such an imaging element as shown in FIG. 2 is used will be described with reference to FIG. 3A and FIG. 3B. Here, FIG. 3A shows an image forming state in the normal pixel 23a. FIG. 3B shows an image forming state in a phase difference detecting pixel 23p.

When the subject is a point light source and when the imaging lens 11 is in a focused state, a pair of subject light fluxes emitted from the subject and passed through different pupil regions symmetric to a center of the optical axis of the imaging lens 11 forms images at the same position on the imaging element 23.

On the other hand, when the imaging lens 11 is in a non-focused state, a pair of the subject light fluxes emitted from the subject and passed through the different pupil regions of the imaging lens 11 forms images at different positions on the imaging element 23. In other words, a phase difference is generated between the images formed by these subject light fluxes forming the pair. This phase difference is detected from, for example, a correlation between the images detected with the right opening phase difference detecting pixel 23R and the left opening phase difference detecting pixel 23L, respectively, so that a defocus amount and a defocus direction of the imaging lens 11 can be detected.

It is to be noted that the partial region of the phase difference detecting pixel 23p is shielded, and hence a decrease in light intensity occurs. The decrease of the light intensity varies in accordance with an area of the light shielding film formed in the phase difference detecting pixel 23p, a position of the light shielding film, an angle of the light entering into the phase difference detecting pixel 23p, and an image height.

The imaging control circuit 25 sets a reading system of the imaging element 23 in accordance with the control signal from the CPU 29, and controls the reading of the image signal from the imaging element 23 in accordance with the set reading system. In this case, the imaging control circuit 25 performs processing to interpolate the signal acquired with the phase difference detecting pixel 23p. The reading system of pixel data from the imaging element 23 is set in accordance with an imaging mode of the digital camera 1. For example, in a case where real time properties are required in reading the pixel data from the imaging element 23 (e.g., in the case of a live view display or a moving image recording), pixel data from the pixels of the same color are mixed to be read, or pixel data of the specific pixel is thinned to be read so that the pixel data can be read at a high speed. On the other hand, in a case where an image quality is required rather than the real time properties (e.g., in the case of a recording of a still image), a resolving power is maintained by reading out the pixel data of all the pixels without performing the mixing reading or the thinning reading.

The imaging control circuit 25 will further be described. FIG. 4 shows an outline of a configuration example of the imaging control circuit 25. The imaging control circuit 25 has an A-AMP 102, an ADC 104, a pixel interpolation processing section 110, a pixel thinning processing section 122, and a pixel mixing processing section 124.

The A-AMP 102 performs analog gain adjustment of the image signal output from the imaging element 23. The ADC 104 is an analog/digital converter, and converts the image signal subjected to the analog gain adjustment by the A-AMP 102 into an image signal (the pixel data) of a digital format. Hereinafter, in the present description, a group of pixel data will be described as imaging data. In addition, a value concerned with each of the pixels indicated by the pixel data will be described as a pixel value.

The pixel interpolation processing section 110 performs processing concerned with interpolation of image data acquired in the phase difference detecting pixel 23p. That is, a part of the phase difference detecting pixel 23p is shielded. Consequently, the image data acquired in the phase difference detecting pixel 23p is different from image data acquired in the normal pixel 23a. In consequence, during exposure to acquire the image, the pixel interpolation processing section 110 interpolates the image data acquired in the phase difference detecting pixel 23p by the image data acquired in the peripheral normal pixel 23a. It is to be noted that during focus detecting exposure, the image data acquired in the phase difference detecting pixel 23p is written as it is to the DRAM 41.

The pixel interpolation processing section 110 has an interpolating direction determination portion 112, a weight calculating portion 114, and an interpolation processing portion 116. The interpolating direction determination portion 112 determines a direction of the normal pixel 23a for use in interpolation of the image data of the phase difference detecting pixel 23p. That is, the interpolating direction determination portion 112 determines a direction of the normal pixel 23a to the phase difference detecting pixel 23p that is an object of the interpolation, when it is determined that the interpolation is to be performed by using the pixel value of the normal pixel in the specific direction. The weight calculating portion 114 determines a weight of each of the pixels to be mixed when the pixel values of the pixels for use in the interpolation are mixed. The interpolation processing portion 116 performs averaging on the basis of weight values calculated by the weight calculating portion 114, and calculates the pixel value. The interpolation processing portion 116 replaces the pixel value of the interpolation object pixel with the calculated pixel value.

The pixel thinning processing section 122 performs processing concerned with the thinning reading of the pixel data. The pixel mixing processing section 124 performs processing concerned with the mixing reading of the pixel data. In this manner, the imaging data prepared by the imaging control circuit is written to the DRAM 41.

The CPU 29 controls the whole digital camera 1 in accordance with a program stored in the after-mentioned ROM 43.

The development processing section 31 includes, for example, an application specific integrated circuit (ASIC). The development processing section 31 reads out the image data from the DRAM 41, performs development processing, and writes the data as displaying image data back to the DRAM. For example, the development processing section 31 applies still image recording image processing to generate still image data when the still image is recorded. Similarly, the development processing section 31 applies moving image recording image processing to generate moving image data when a moving image is recorded. Furthermore, the development processing section 31 applies display image processing to generate displaying image data, when a live view is displayed.

The focus detection circuit 33 includes, for example, the ASIC. The focus detection circuit 33 reads out the data acquired by the phase difference detecting pixel 23*p* from the DRAM 41. The focus detection circuit 33 performs processing concerned with the detection of a focus position on the basis of the data acquired by the phase difference detecting pixel 23*p*.

The video encoder 35 reads out the displaying image data generated by the development processing section 31 and temporarily stored in the DRAM 41, and outputs the displaying image data to the display section 37.

The display section 37 includes a display such as a liquid crystal display or an organic EL display, and disposed on, for example, a back surface of the digital camera 1. The display section 37 displays the image in accordance with the displaying image data input from the video encoder 35. The display section 37 is for use in live view display, recorded image display, or the like.

The bus 39 is connected to the imaging control circuit 25, the CPU 29, the development processing section 31, the focus detection circuit 33, the video encoder 35, the DRAM 41, the ROM 43, and the recording medium 45. Various types of data generated in these respective components are transferred via the bus 39.

The DRAM 41 is an electrically rewritable memory, and temporarily stores various types of data such as the above-mentioned imaging data (the pixel data), recording image data, displaying image data, and processed data by the CPU 29. It is to be noted that as a memory for temporary storage, a synchronous dynamic random access memory (SDRAM) may be used.

The ROM 43 that functions as one example of a storage section is a nonvolatile memory such as a mask ROM or a flash memory. The ROM 43 stores various types of data such as a program for use in the CPU 29 and an adjustment value of the digital camera 1.

The recording medium 45 is a removable medium or a mounted medium in the digital camera 1, and records the recording image data as an image file of a predetermined format.

Figure 5:
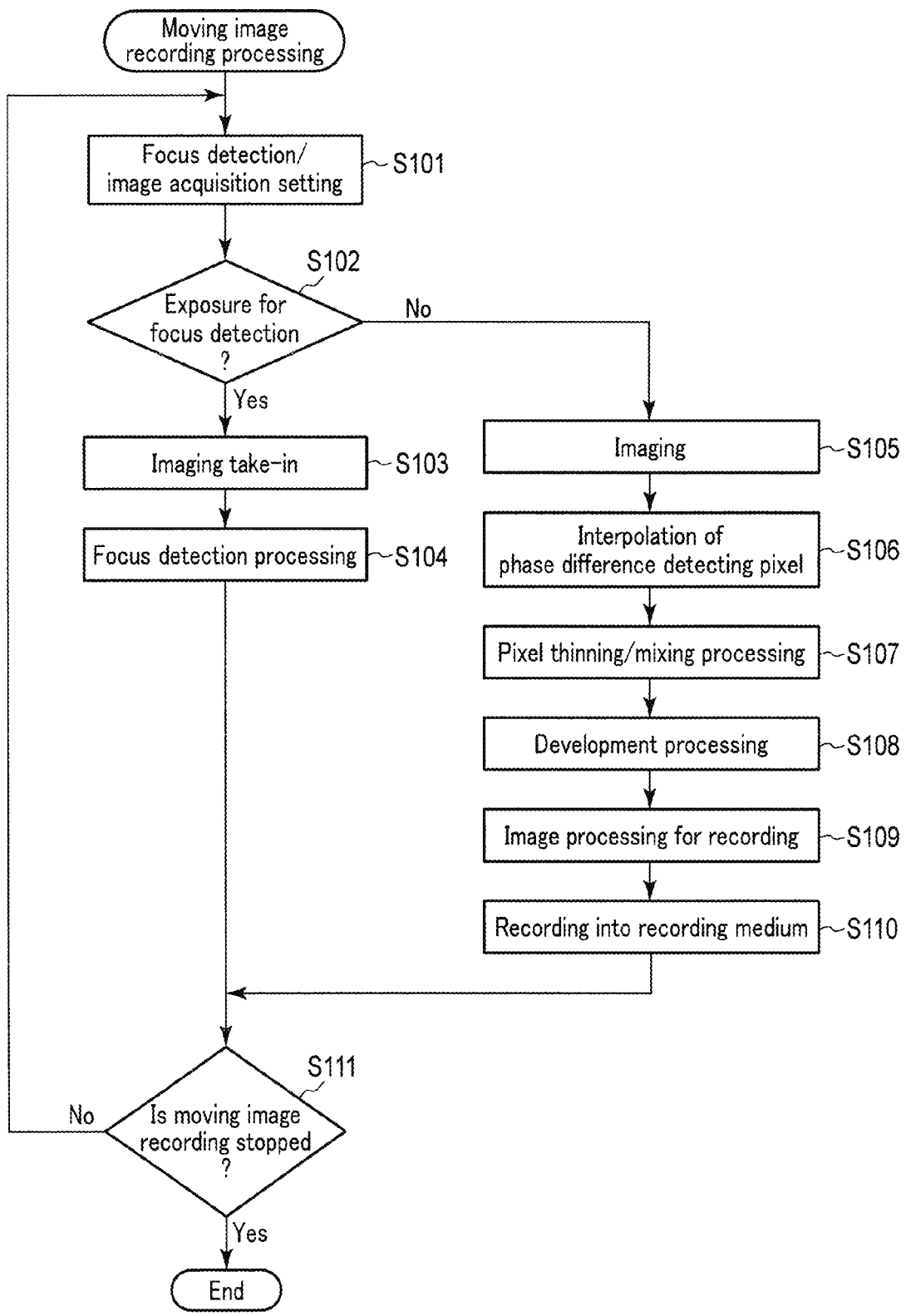
FIG. 5 is a flowchart showing one example of moving image recording processing according to the embodiment.

An operation of the digital camera 1 according to the present embodiment will be described. One example of processing of moving image recording by the digital camera 1 according to the present embodiment will be described with reference to a flowchart shown in FIG. 5. The moving image recording starts when the release button is pressed in, for example, a moving image photographing mode. Additionally, here, the processing of the moving image recording is described, but similar processing can also be performed in an operation of still image recording. It is to be noted that the processing described with reference to FIG. 5 is executed by the ASIC or the CPU 29 in accordance with the program stored in the ROM 43. The program concerned with the processing can be recorded in various recording mediums such as an optical disc, a magnetic disc and a semiconductor memory.

In step S101, the CPU 29 sets that exposure to be performed next is exposure for the focus detection or exposure for acquisition of the image to be recorded.

In step S102, the CPU 29 determines whether or not the exposure set in step S101 is the exposure for the focus detection. When it is determined that the exposure is the exposure for the focus detection, the processing advances to step S103.

In step S103, the imaging section 21 takes in the image. That is, the imaging element 23 performs photoelectric conversion, and the imaging control circuit 25 writes digitized data to the DRAM 41.

In step S104, the focus detection circuit 33 performs the focus detection in which the phase difference is utilized, on the basis of data acquired by the phase difference detecting pixel 23*p*. The CPU 29 controls the driving section 17 to drive the imaging lens 11 for focusing on the basis of the result of the focus detection. Afterward, the processing advances to step S111.

When it is determined in step S102 that the exposure is not the exposure for the focus detection, the processing advances to step S105.

In step S105, the imaging section 21 performs an imaging operation. That is, the imaging element 23 performs the photoelectric conversion, the A-AMP 102 performs the analog gain adjustment, and the ADC 104 converts an analog signal to a digital signal.

In step S106, the pixel interpolation processing section 110 of the imaging section 21 performs pixel interpolation processing concerning the phase difference detecting pixel 23*p*. This pixel interpolation processing will be described later.

In step S107, the pixel thinning processing section 122 of the imaging section 21 performs required pixel thinning processing, and the pixel mixing processing section 124 of the imaging section 21 performs required pixel mixing processing. The imaging section 21 writes the image data generated as described above to the DRAM 41.

In step S108, the development processing section 31 reads out the image data from the DRAM 41, and performs development processing.

In step S109, the development processing section 31 performs recording image processing to the data subjected to the development processing.

In step S110, the CPU 29 records the image to be recorded which is prepared in step S109, into the recording medium 45. Afterward, the processing advances to step S111.

In step S111, the CPU 29 determines whether or not an instruction to stop the moving image recording is input. The instruction to stop the moving image recording is input by, for example, pressing the release button during a moving image recording operation. When the instruction to stop the moving image recording is not input, the processing returns to step S101. On the other hand, when the instruction to stop the moving image recording is input, the present moving image recording processing ends.

Figure 6A:
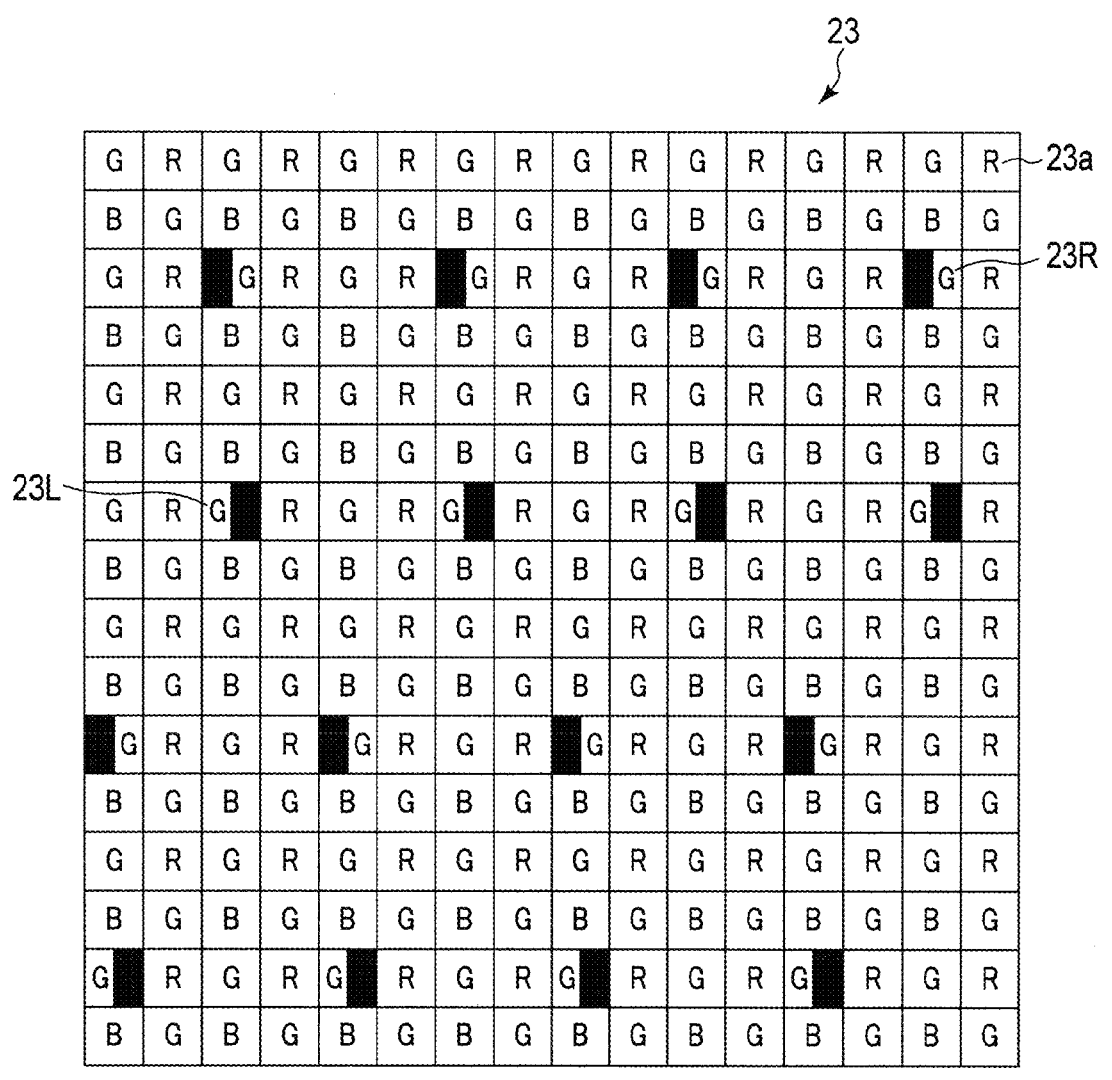
Figure 6B:
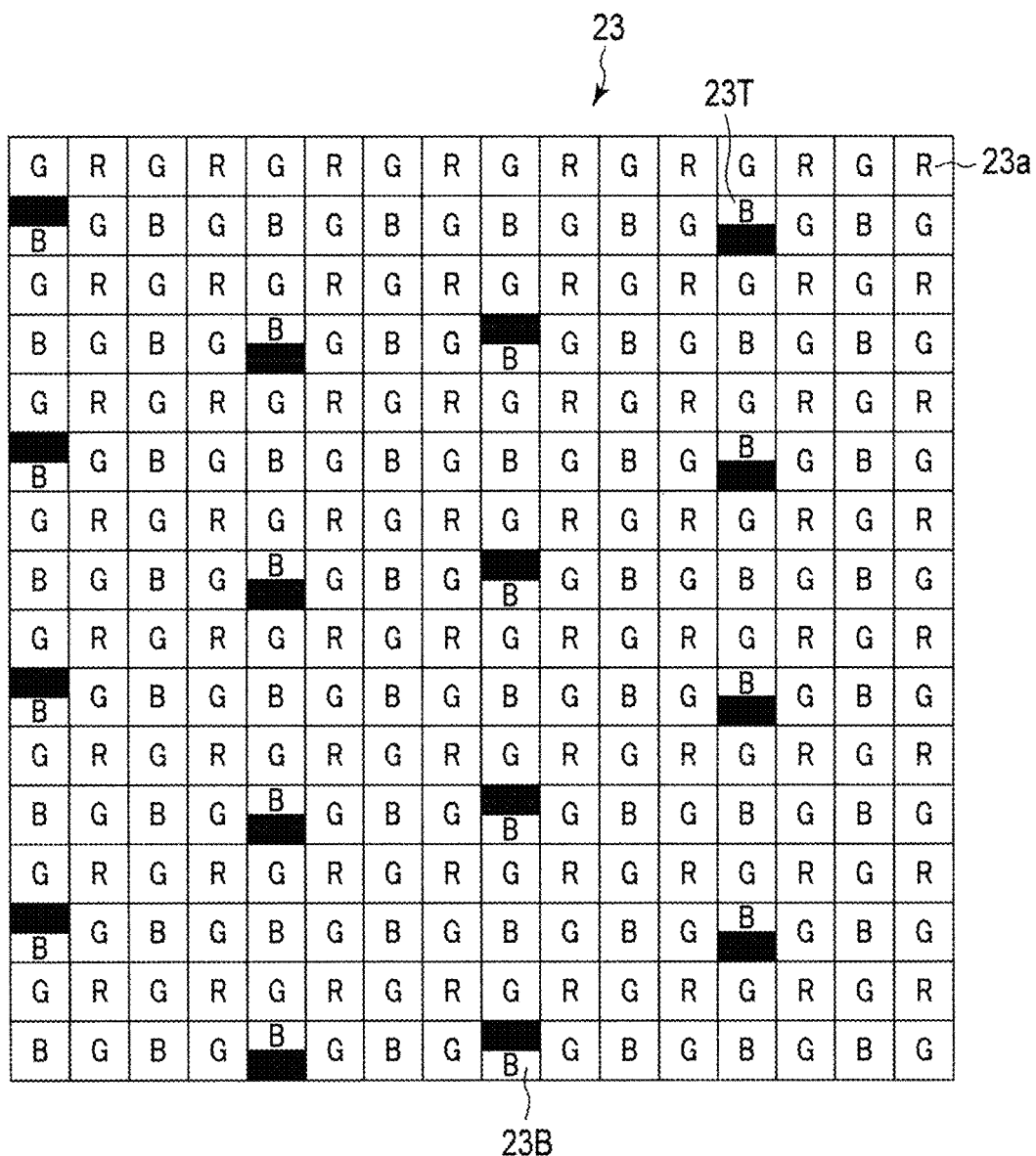
FIG. 6B is a diagram showing an outline of a configuration example of the imaging element according to the embodiment, and showing an arrangement example of upper opening phase difference detecting pixels and lower opening phase difference detecting pixels.

Next, pixel interpolation performed concerning the phase difference detecting pixel 23*p* in step S106 will be described in detail. First, an arrangement of the phase difference detecting pixels 23*p* will further be described with reference to FIG. 6A and FIG. 6B. FIG. 6A is a diagram displaying an arrangement of the right opening phase difference detecting pixel 23R and the left opening phase difference detecting pixel 23L among the phase difference detecting pixels 23*p* in the diagram shown in FIG. 2, the right opening phase difference detecting pixel 23R and the left opening phase difference detecting pixel 23L being disposed to detect the phase difference in the horizontal direction. FIG. 6A does not display the lower opening phase difference detecting pixel 23B and the upper opening phase difference detecting pixel 23T to detect the phase difference in the vertical direction. On the other hand, FIG. 6B displays the lower opening phase difference detecting pixel 23B and the upper opening phase difference detecting pixel 23T, and does not display the right opening phase difference detecting pixel 23R and the left opening phase difference detecting pixel 23L.

First, the arrangement of the right opening phase difference detecting pixels 23R and the left opening phase difference detecting pixels 23L is described. As apparent from FIG. 6A, the right opening phase difference detecting pixels 23R are arranged at uniform intervals in a row in which the R pixels and the G (Gr) pixels are alternately arranged in the horizontal direction. The interval between the right opening phase difference detecting pixels 23R is four pixels. In the row in which the right opening phase difference detecting pixels 23R are arranged, the left opening phase difference detecting pixels 23L are not arranged. Similarly, the left opening phase difference detecting pixels 23L are arranged at uniform intervals, i.e., every four pixels in the row in which the R pixels and the G (Gr) pixels are alternately arranged in the horizontal direction. In the row in which the left opening phase difference detecting pixels 23L are arranged, the right opening phase difference detecting pixels 23R are not arranged.

On the other hand, when seen in the vertical direction, an interval between the right opening phase difference detecting pixel 23R and the left opening phase difference detecting pixel 23L is not uniform. That is, in FIG. 6A, when the pixels are counted in order from the top of a column in which the right opening phase difference detecting pixel 23R and the left opening phase difference detecting pixel 23L are disposed, the left opening phase difference detecting pixel 23L is disposed in the fourth pixel from the right opening phase difference detecting pixel 23R, but the right opening phase difference detecting pixel 23R is disposed in the twelfth pixel from the left opening phase difference detecting pixel 23L.

As described above, the right opening phase difference detecting pixels 23R and the left opening phase difference detecting pixels 23L are uniformly arranged in the horizontal direction (a line direction), but the pixels are nonuniformly arranged in the vertical direction (a column direction). The phase difference detecting pixels 23p are nonuniformly arranged, because the number of the phase difference detecting pixels 23p is decreased to inhibit, as much as possible, image deterioration generated due to presence of the phase difference detecting pixels 23p, concerning the image data to be obtained by the imaging element 23.

Next, an arrangement of the upper opening phase difference detecting pixels 23T and the lower opening phase difference detecting pixels 23B will be described. As apparent from FIG. 6B, the upper opening phase difference detecting pixels 23T are arranged at uniform intervals, i.e., every four pixels in a column in which the B pixels and the G (Gb) pixels are alternately arranged in the vertical direction. In the column in which the upper opening phase difference detecting pixels 23T are arranged, the lower opening phase difference detecting pixels 23B are not arranged. Similarly, the lower opening phase difference detecting pixels 23B are arranged at uniform intervals, i.e., every four pixels in the column in which the B pixels and the G (Gb) pixels are alternately arranged in the vertical direction. In the column in which the lower opening phase difference detecting pixels 23B are arranged, the upper opening phase difference detecting pixels 23T are not arranged.

On the other hand, when seen in the horizontal direction, an interval between the upper opening phase difference detecting pixel 23T and the lower opening phase difference detecting pixel 23B is not uniform. That is, in FIG. 6B, when the pixels are counted in order from the left of a row in which the upper opening phase difference detecting pixel 23T and the lower opening phase difference detecting pixel 23B are disposed, the lower opening phase difference detecting pixel 23B is disposed in the fourth pixel from the upper opening phase difference detecting pixel 23T, but the upper opening phase difference detecting pixel 23T is disposed in the twelfth pixel from the lower opening phase difference detecting pixel 23B.

As described above, the upper opening phase difference detecting pixels 23T and the lower opening phase difference detecting pixels 23B are uniformly arranged in the vertical direction (the column direction), but nonuniformly arranged in the horizontal direction (the line direction).

Next, it will be described that a value (the pixel value) concerned with light intensity acquired by the phase difference detecting pixels 23p arranged as described above is interpolated by using the pixel values obtained with the peripheral normal pixels 23a.

First, there is considered such a case of the right opening phase difference detecting pixels 23R and the left opening phase difference detecting pixels 23L as shown in FIG. 6A. For example, as schematically shown in FIG. 7A, a subject with vertical stripes is imaged by using the imaging element 23. Here, in FIG. 7A, hatched pixels show a dark place of the subject image in which light intensity is low, and pixels that are not hatched show a bright place of the subject image in which the light intensity is high.

Figure 7B:
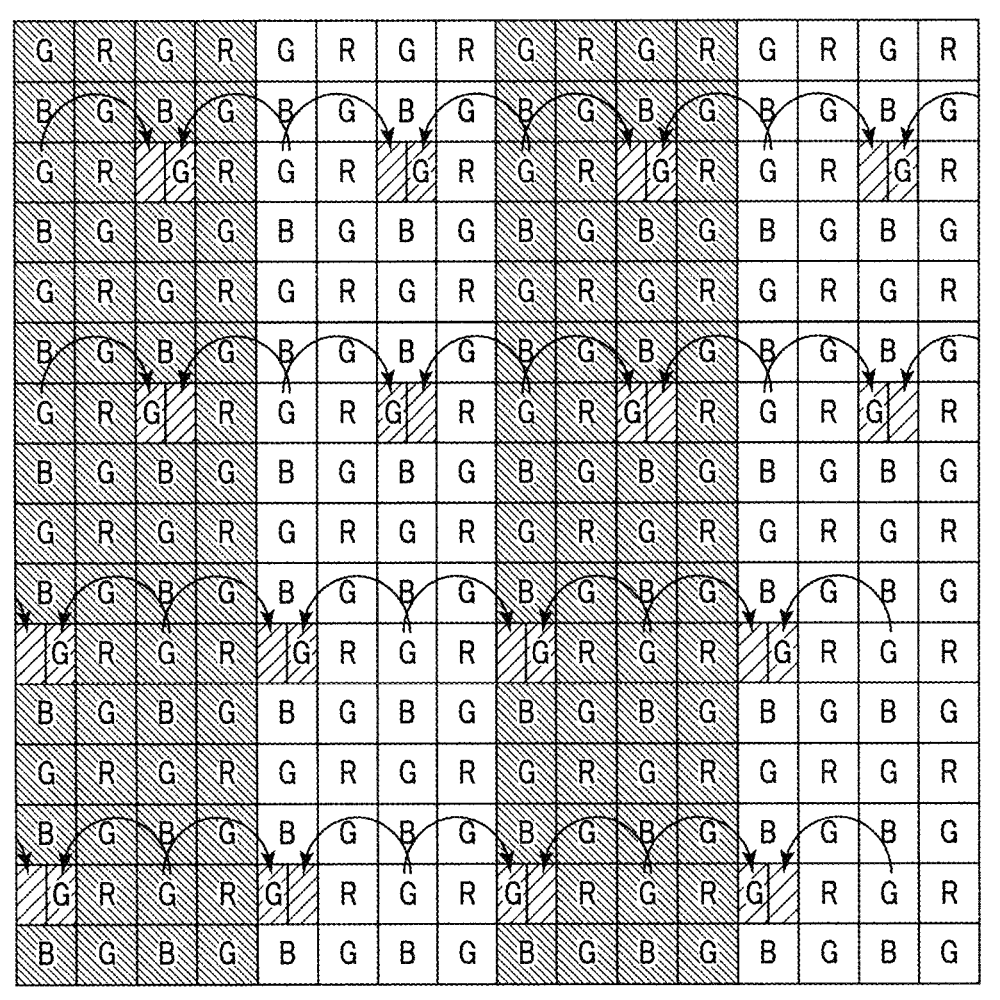

FIG. 7B schematically shows the pixel value of each pixel after the interpolation which is obtained when such a subject as shown in FIG. 7A is imaged. In FIG. 7B, a pixel that is hatched with a narrow interval is defined as a pixel of a low pixel value, a pixel that is hatched with a wide interval is defined as a pixel of a higher pixel value, and the pixel that is not hatched is defined as a pixel of a further higher pixel value. In the normal pixel 23a, the pixel value can be obtained in accordance with the subject image. On the other hand, in the phase difference detecting pixel 23p, a part of the pixel is shielded, and hence the pixel value is not exactly obtained. Therefore, the pixel value of the phase difference detecting pixel 23p is interpolated by using the pixel values of the peripherally existing normal pixels 23a. Here, the pixel value of the phase difference detecting pixel 23p is interpolated by using the pixel values of the normal pixels 23a present on right and left sides of the phase difference detecting pixel 23p (adjacent in the horizontal direction, i.e., the line direction). Then, as shown in FIG. 7B, the interpolation is disadvantageously performed by the pixel value different from a pixel value which should be originally obtained.

Figure 7C:
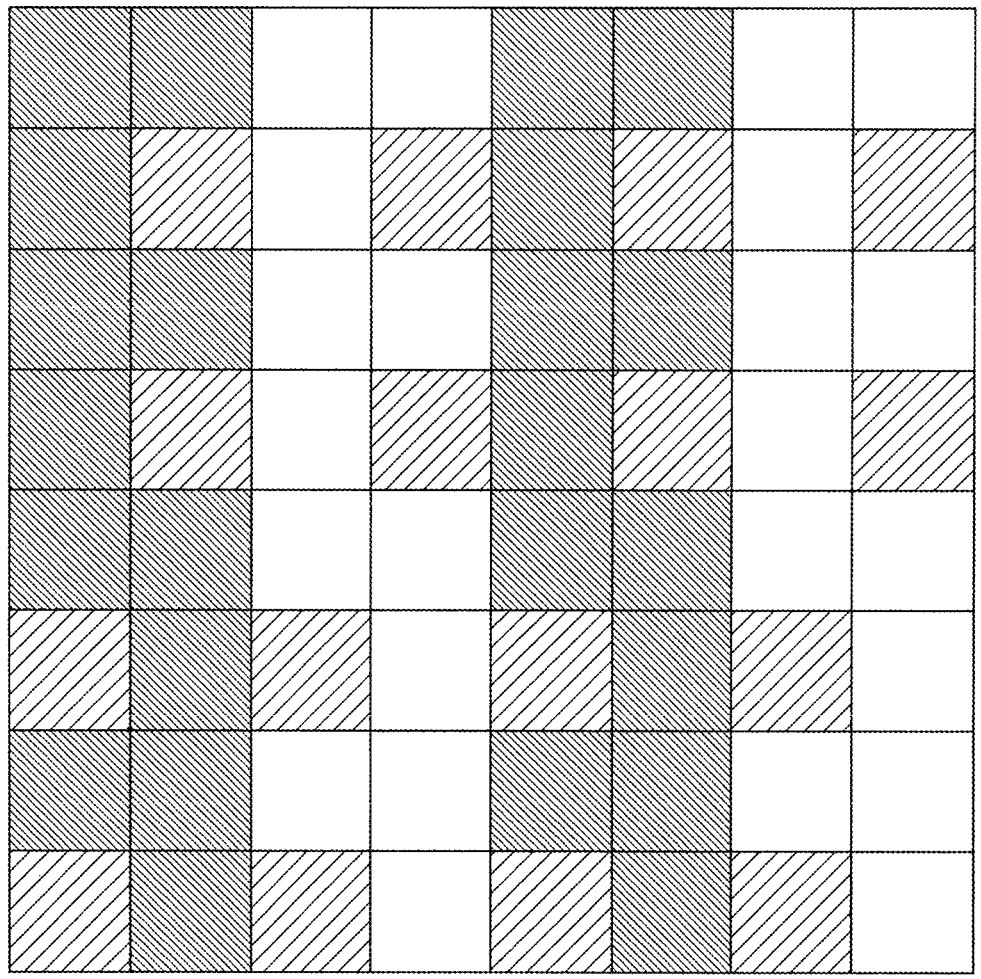
FIG. 7C is a diagram to explain the pixel interpolation, and a schematic view showing an outline of an image that can be obtained in a case where the interpolation is performed by using the pixel values of the normal pixels adjacent in the horizontal direction.

FIG. 7C schematically shows an image obtained as a result. FIG. 7C shows a case where one pixel value is determined on the basis of the pixel values obtained in four pixels: the Gr pixel, the R pixel, the B pixel and the Gb pixel. Here, in FIG. 7C, a pixel that is hatched with a narrow interval is defined as a pixel of a low pixel value, a pixel that is hatched with a wide interval is defined as a pixel of a higher pixel value, and the pixel that is not hatched is defined as a pixel of a further higher pixel value. As shown in FIG. 7C, when the subject with vertical stripes is imaged, a "crinkle" pattern disadvantageously enters into a striped pattern. That is, the vertical stripe shifts to the left side in four upper stages and shifts to the right side in four lower stages in FIG. 7C, and the vertical stripes are jagged. Thus, when the pixel value of the phase difference detecting pixel 23p is interpolated by using the pixel values of the normal pixels 23a present on the right and left sides of the phase difference detecting pixel 23p, the image quality of the obtained image noticeably deteriorates.

In the example shown in FIG. 7B and FIG. 7C, there is shown the case where the pixel value of each of the phase difference detecting pixels 23p is interpolated by using the pixel values of the normal pixels 23a present on the right and left sides of the phase difference detecting pixel 23p, but next, there is shown a case where the pixel value of the phase difference detecting pixel 23p is interpolated by using the pixel values of the normal pixels 23a present on upper and lower sides of the phase difference detecting pixel 23p (adjacent in the vertical direction, i.e., the column direction). When the pixel value of the phase difference detecting pixel 23p is interpolated by using the pixel values of the normal pixels 23a present on upper and lower sides of the phase difference detecting pixel 23p, a diagram corresponding to FIG. 7B turns to FIG. 8A. As a result, a diagram corresponding to FIG. 7C is changed to FIG. 8B. In this case, such a "crinkle" pattern as recognized in FIG. 7C does not enter into the striped pattern, but a vertically striped regular pattern can be obtained. That is, when the pixel value of the phase difference detecting pixel 23p is interpolated by using the pixel values of the normal pixels 23a present on upper and lower sides of the phase difference detecting pixel 23p, deterioration is not recognized in the obtained image.

Figure 8A:
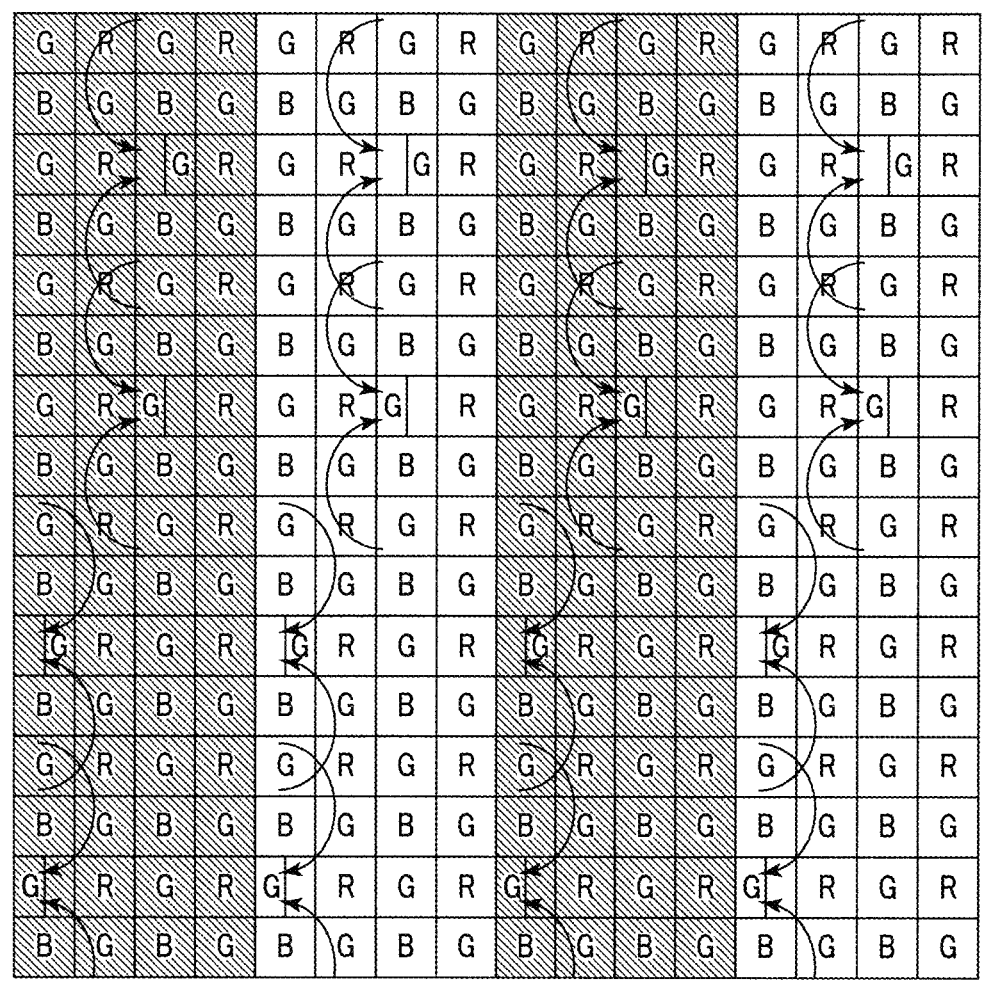
Figure 8B:
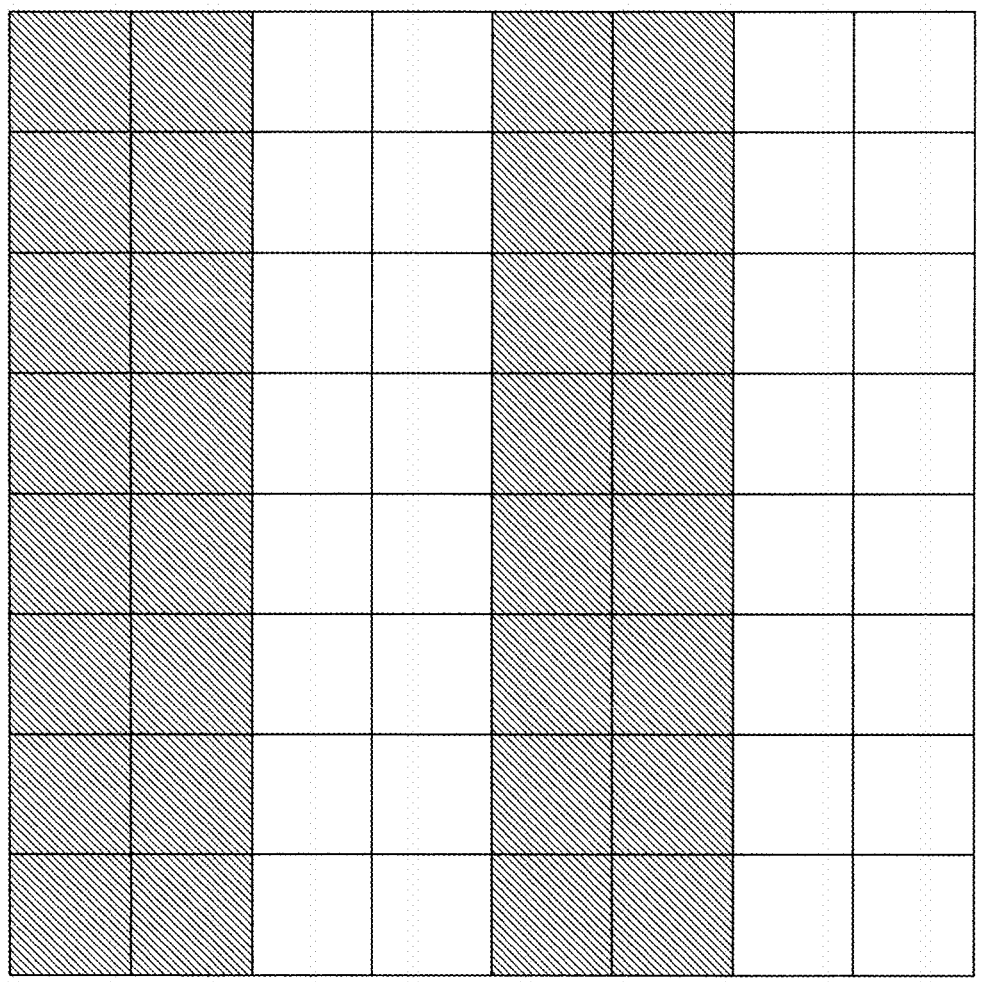
FIG. 8B is a diagram to explain the pixel interpolation, and a schematic view showing an outline of an image that can be obtained in a case where the interpolation is performed by using the pixel values of the normal pixels adjacent in the vertical direction.
Figure 9A:
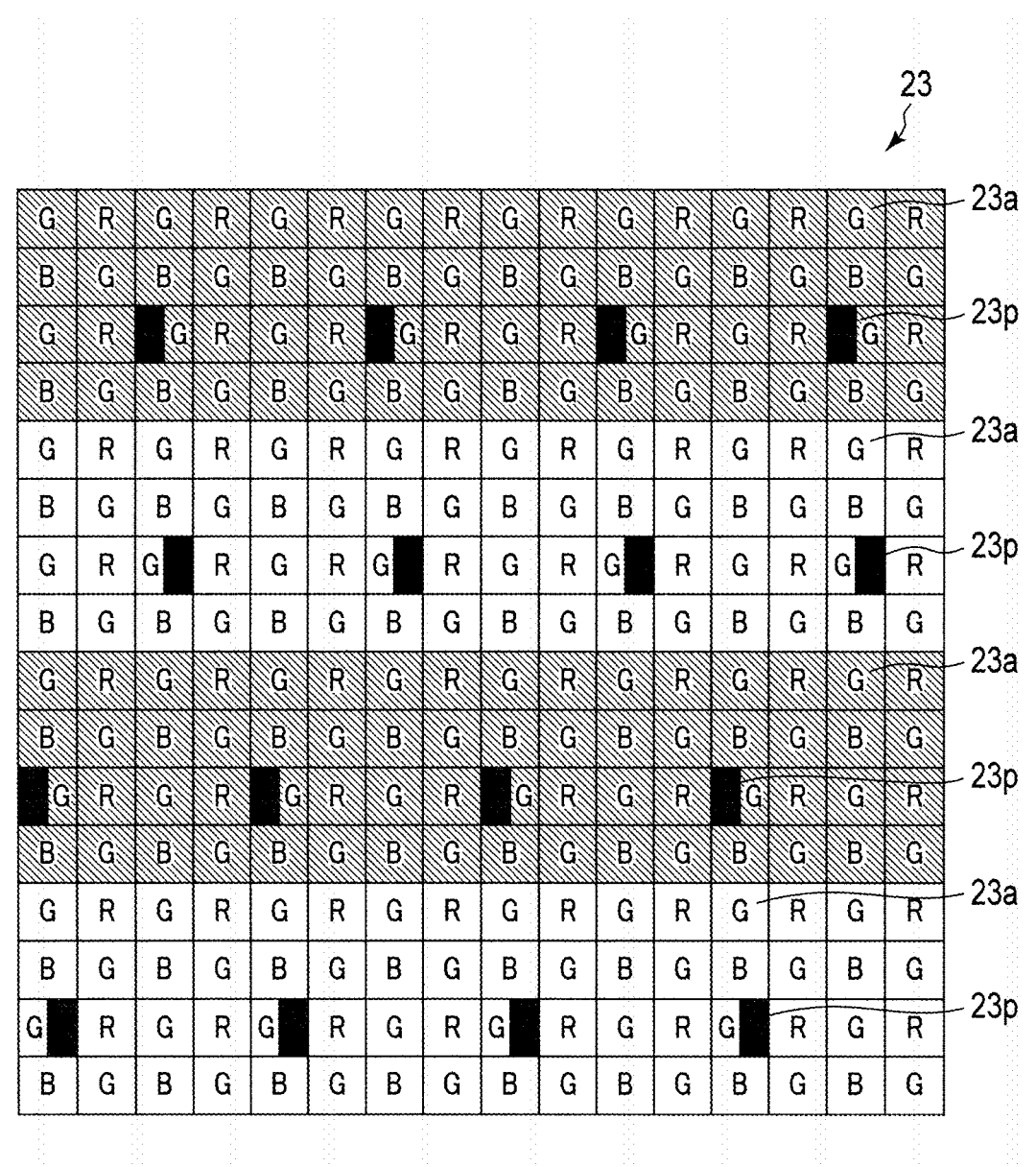
Figure 9B:
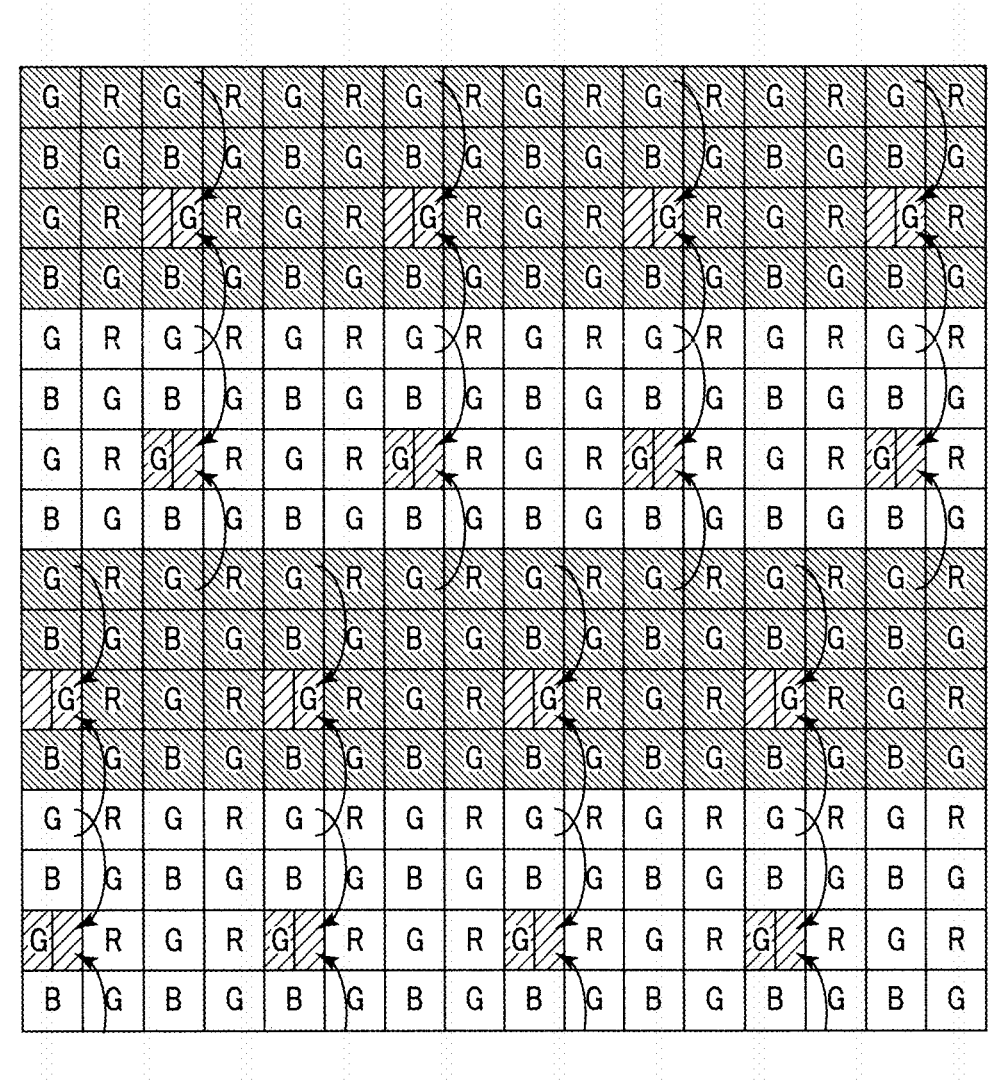

A case where a subject with horizontal stripes is imaged is similarly considered. That is, FIG. 9A shows a diagram showing the subject image corresponding to the diagram shown in FIG. 7A. In this case, when the pixel value of each of the phase difference detecting pixels 23p is interpolated by using the pixel values of the normal pixels 23a present on upper and lower sides of each of the phase difference detecting pixels 23p, the result is as follows. That is, a diagram corresponding to FIG. 7B and FIG. 8A is such a diagram as in FIG. 9B. Additionally, a diagram corresponding to FIG. 7C and FIG. 8B is such a diagram as in FIG. 9C. In this case, as shown in FIG. 9C, the obtained image slightly deteriorates, but a boundary of a striped pattern is only slightly blurred and ambiguous. That is, in the diagram shown in FIG. 9C, a pattern of horizontal stripes is maintained, and no noticeable deterioration of the image quality in which the pattern vertically shifts and includes the "crinkle" pattern is observed.

As described above, the right opening phase difference detecting pixels 23R and the left opening phase difference detecting pixels 23L are uniformly arranged in the horizontal direction (the line direction), but nonuniformly arranged in the vertical direction (the column direction). In this case, when the pixel value of each of the phase difference detecting pixels 23p is interpolated, the interpolation is performed by using the pixel values of the normal pixels 23a adjacent to the phase difference detecting pixel 23p in the vertical direction (the column direction), so that the deterioration of the image quality is prevented. That is, in the case where the phase difference detecting pixel 23p is interpolated, when the interpolation is performed by using the normal pixels 23a in the direction in which the pixels are nonuniformly arranged, the deterioration of the image quality is prevented.

Figure 10A:
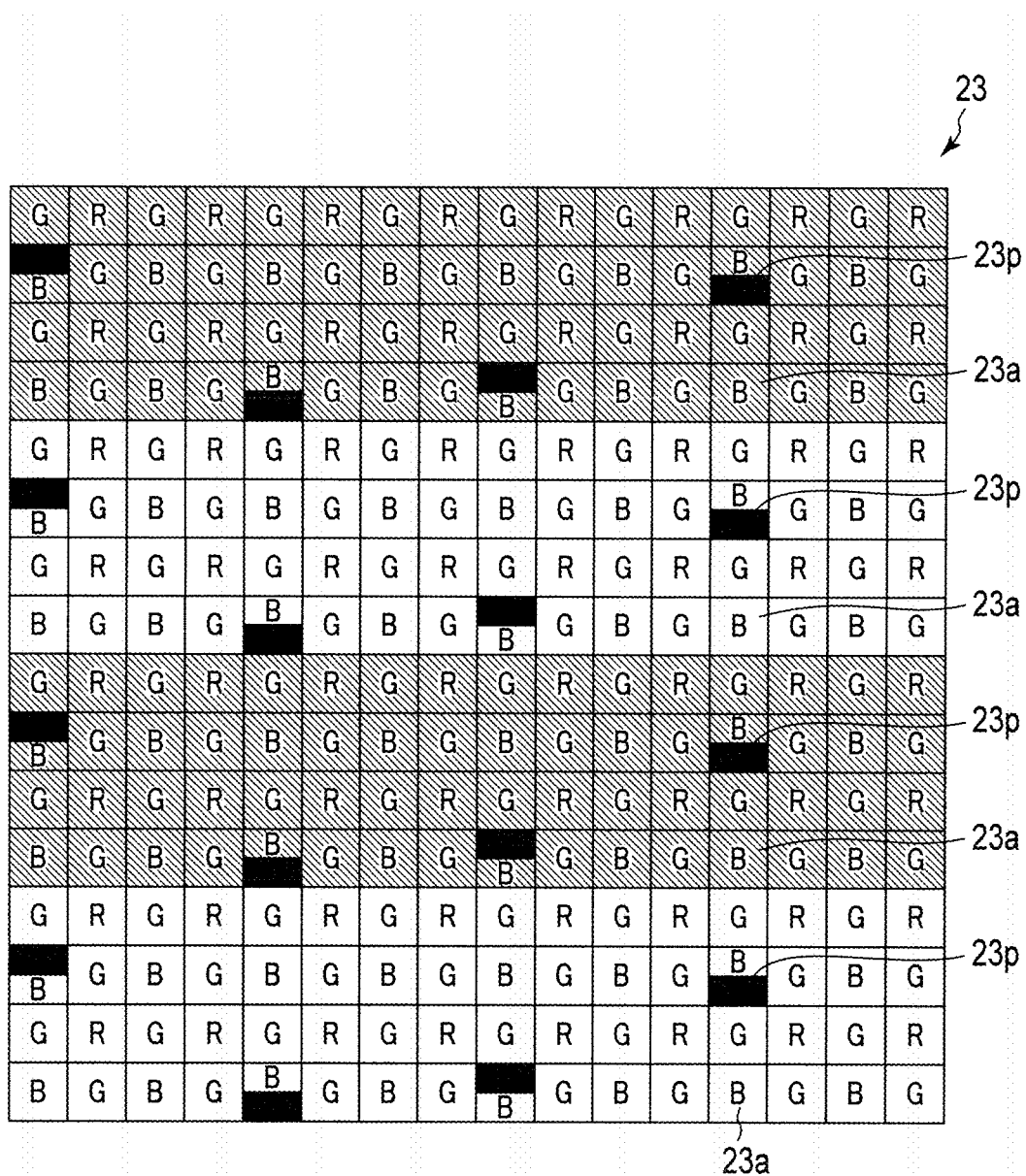
FIG. 10A is a diagram to explain the pixel interpolation, and a schematic view showing an outline of the subject image.
Figure 10B:
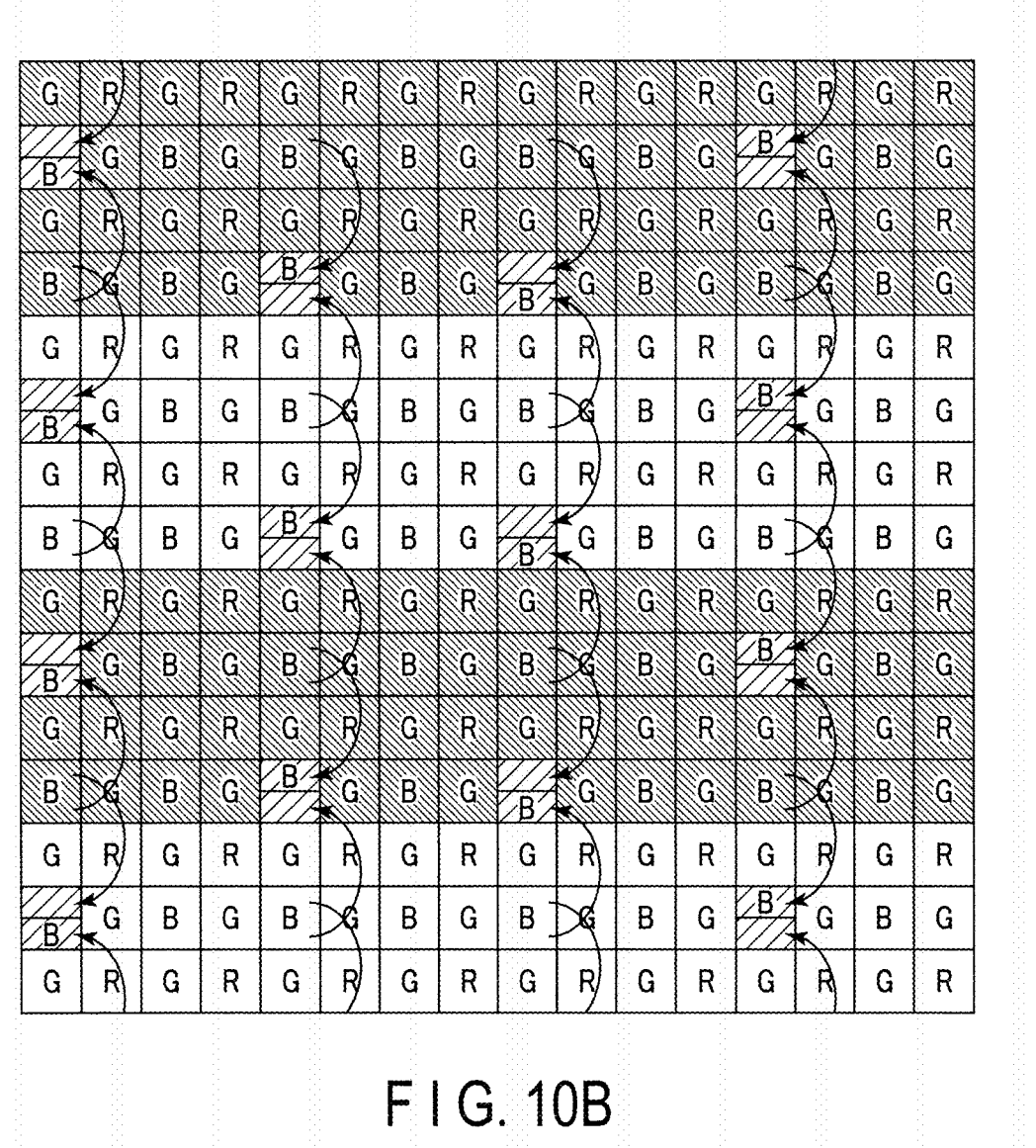
Figure 10C:
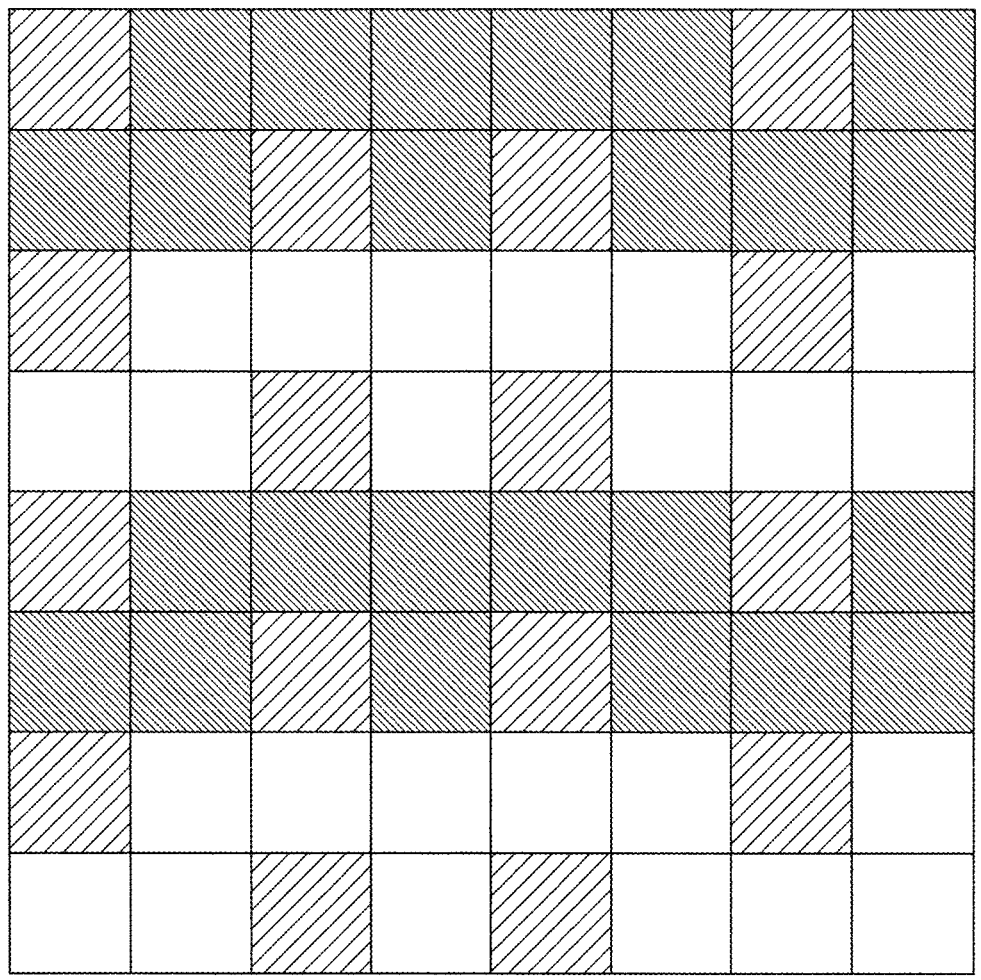
FIG. 10C is a diagram to explain the pixel interpolation, and a schematic view showing an outline of an image that can be obtained in a case where the interpolation is performed by using the pixel values of the normal pixels adjacent in the vertical direction.

Similarly, there is considered such a case of the upper opening phase difference detecting pixels 23T and the lower opening phase difference detecting pixels 23B as shown in FIG. 6B. For example, as schematically shown in FIG. 10A, a subject with horizontal stripes is imaged by using the imaging element 23. In this case, when the pixel value of each of the phase difference detecting pixels 23p is interpolated by using the pixel values of the normal pixels 23a present on upper and lower sides of the phase difference detecting pixel 23p (adjacent in the vertical direction, i.e., the column direction), such interpolation as shown in FIG. 10B is performed, and such an image as shown in FIG. 10C can be obtained. That is, the obtained image includes a "crinkle" pattern in a horizontally striped pattern, and hence an image quality noticeably deteriorates.

Figure 11A:
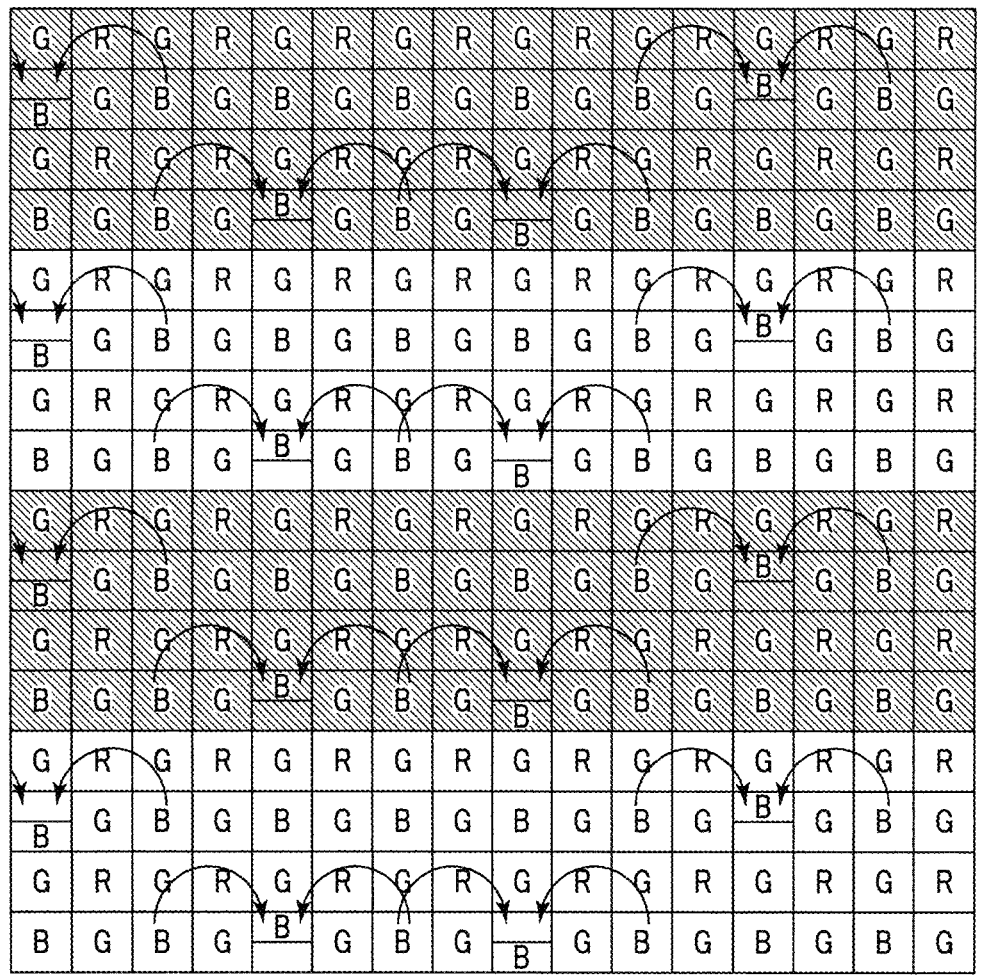
FIG. 11A is a diagram to explain the pixel interpolation, and a schematic view to explain that the interpolation is performed by using pixel values of normal pixels adjacent to the upper opening phase difference detecting pixels or the lower opening phase difference detecting pixels in the horizontal direction.
Figure 11B:
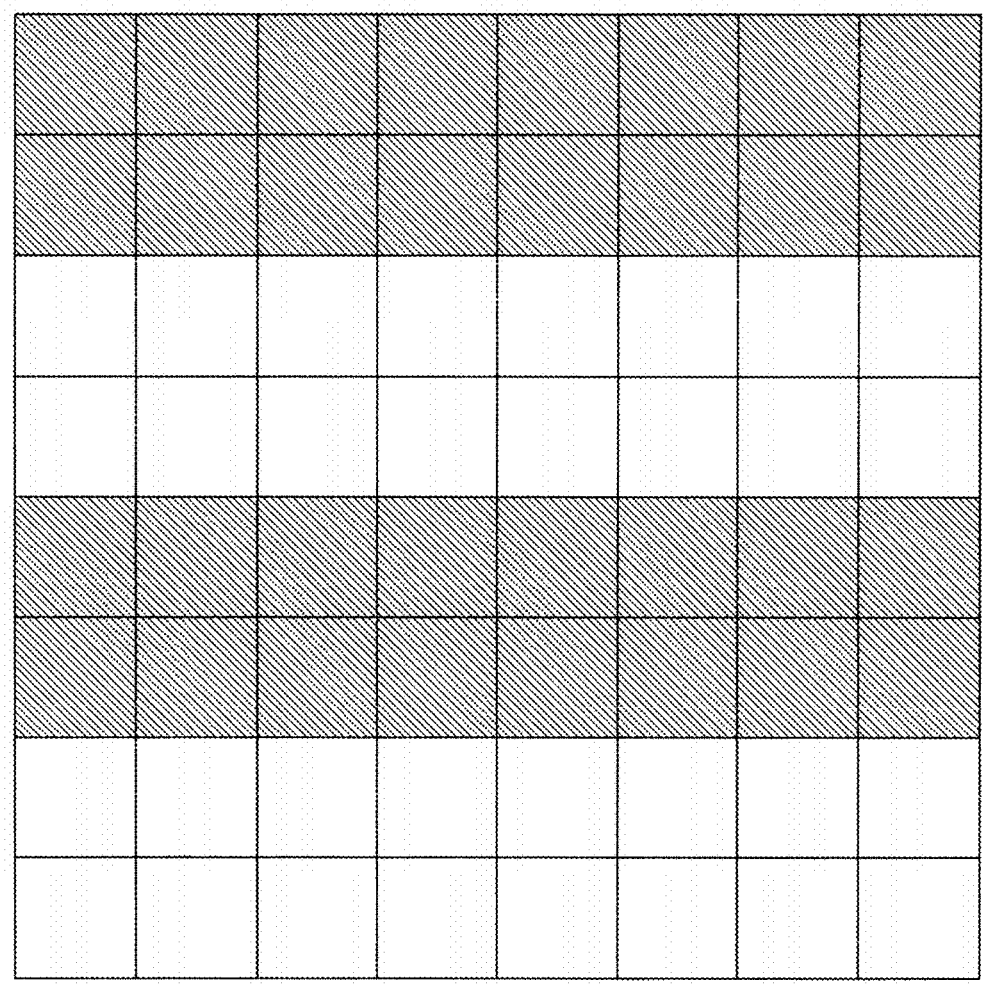
FIG. 11B is a diagram to explain the pixel interpolation, and a schematic view showing an outline of an image that can be obtained in a case where the interpolation is performed by using the pixel values of the normal pixels adjacent in the horizontal direction.

It is considered that the subject with the horizontal stripes is imaged, and the pixel value of each of the phase difference detecting pixels 23p is interpolated by using pixel values of the normal pixels 23a present on the right and left sides of the phase difference detecting pixel 23p (adjacent in the horizontal direction, i.e., the line direction). In this case, such interpolation as shown in FIG. 11A is performed, and such an image as shown in FIG. 11B can be obtained. That is, the deterioration of the image quality is not recognized in the obtained image.

Figure 12A:
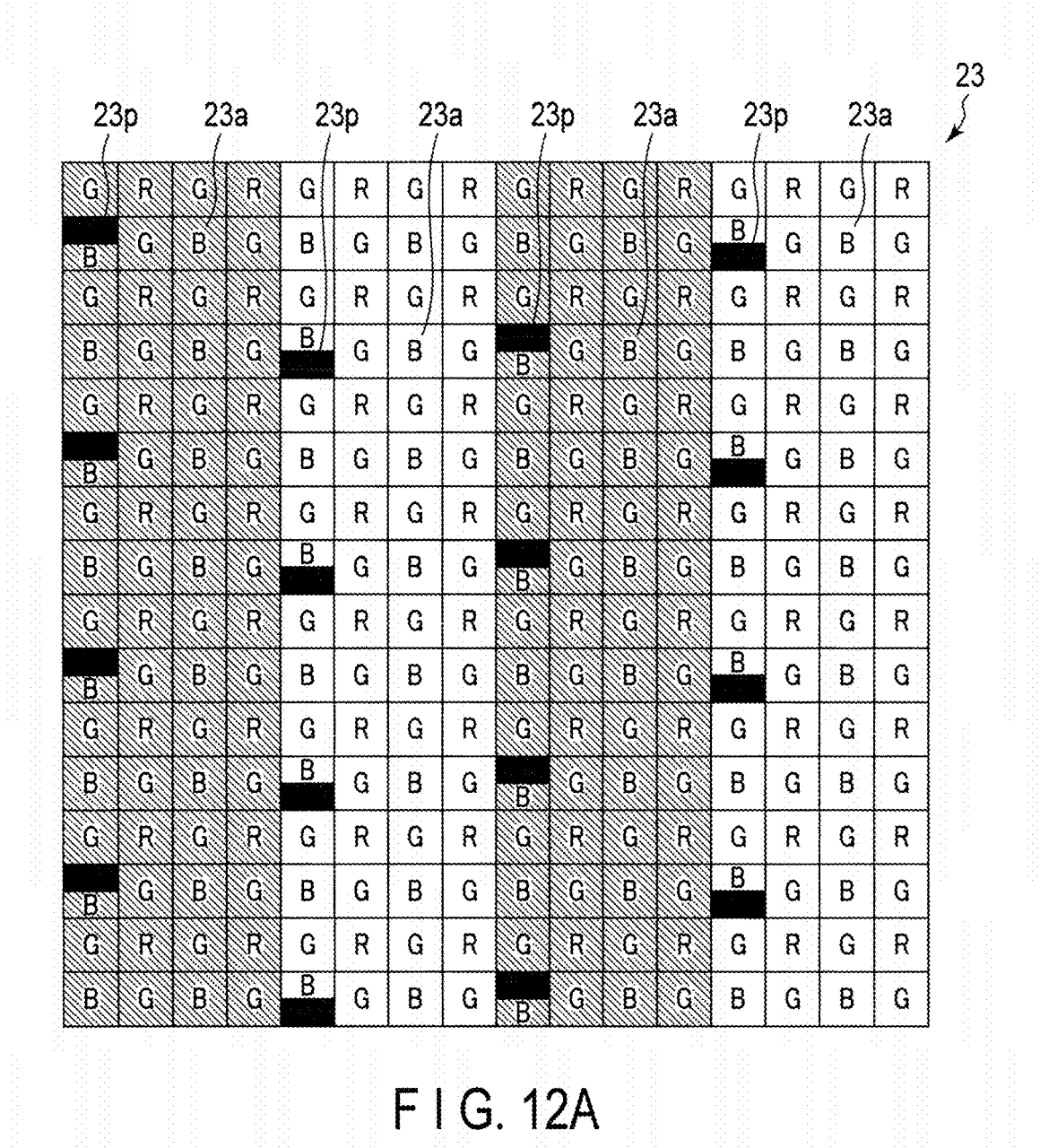
Figure 12B:
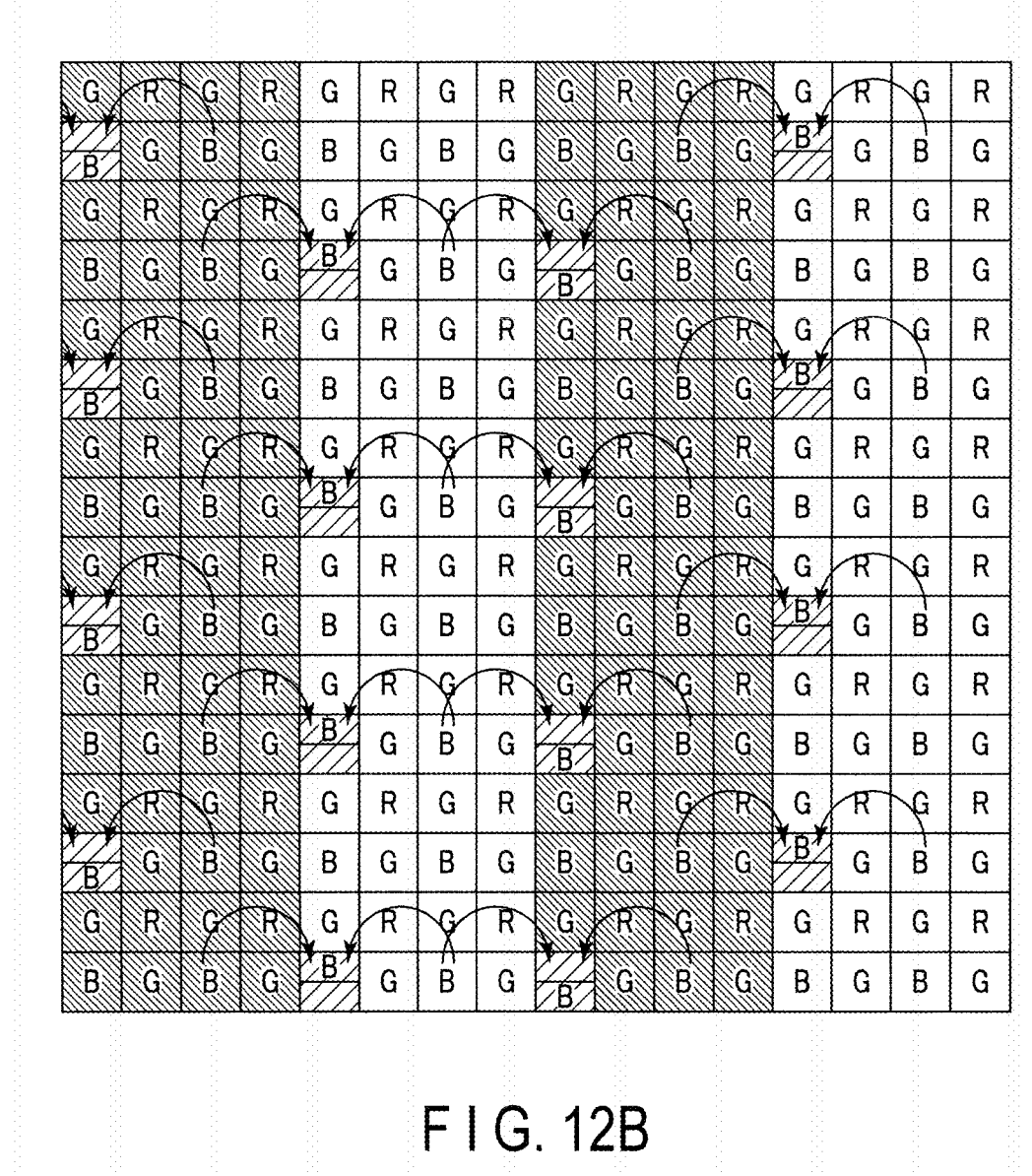
Figure 12C:
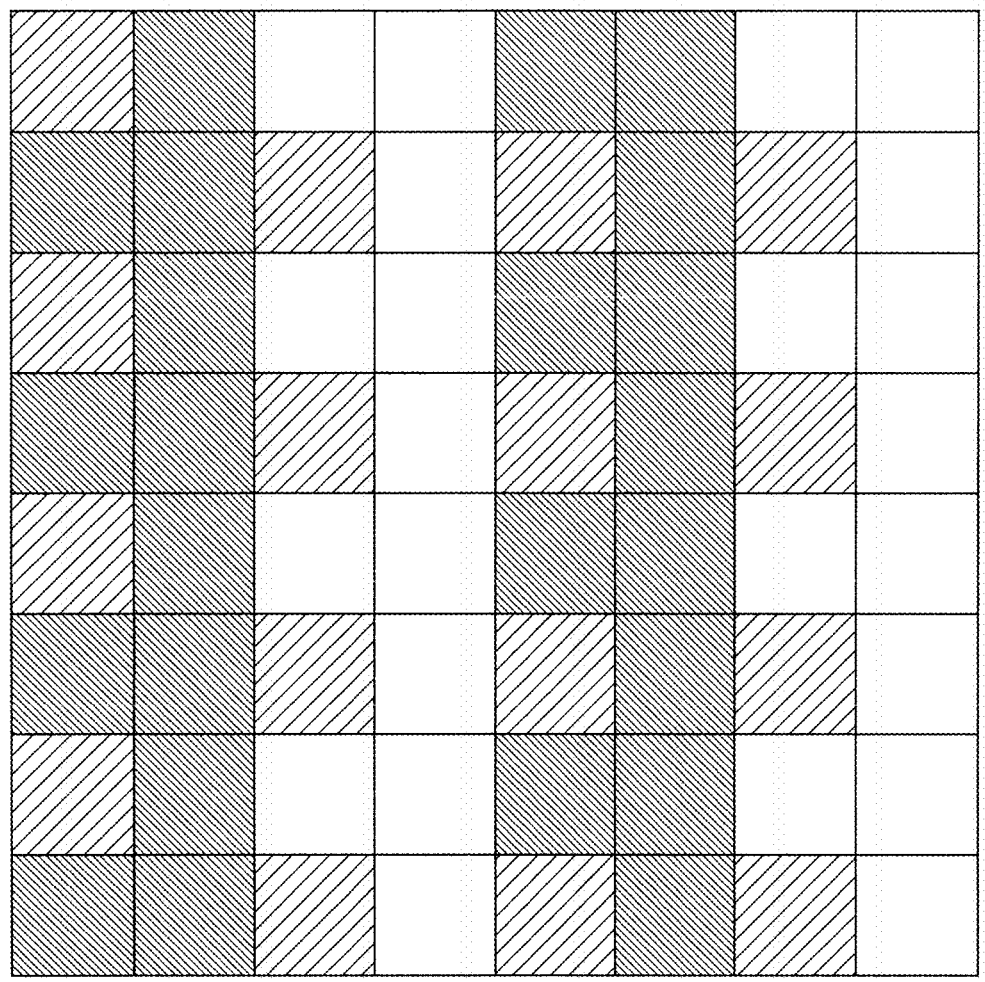
FIG. 12C is a diagram to explain the pixel interpolation, and a schematic view showing an outline of the image that can be obtained in a case where the interpolation is performed by using the pixel values of the normal pixels adjacent in the horizontal direction.

Additionally, as shown in FIG. 12A, it is considered that the subject with the vertical stripes is imaged, and the pixel value of each of the phase difference detecting pixels 23p is interpolated by using the pixel values of the normal pixels 23a present on the right and left sides of the phase difference detecting pixel 23p (adjacent in the horizontal direction, i.e., the line direction). In this case, such interpolation as shown in FIG. 12B is performed, and such an image as shown in FIG. 12C can be obtained. That is, the deterioration of the image quality is not noticeably recognized in the obtained image.

As described above, the upper opening phase difference detecting pixels 23T and the lower opening phase difference detecting pixels 23B are uniformly arranged in the vertical direction (the column direction), but nonuniformly arranged in the horizontal direction (the line direction). In this case, when the pixel value of the phase difference detecting pixel 23p is interpolated, the interpolation is performed by using the pixel values of the normal pixels 23a adjacent to the phase difference detecting pixel 23p in the horizontal direction (the line direction), so that the deterioration of the image quality is prevented. That is, when the interpolation of the phase difference detecting pixels 23p is performed, the interpolation is performed by using the normal pixels 23a in the direction in which the pixels are nonuniformly arranged, so that the deterioration of the image quality is prevented.

As described above, in the present embodiment, when the pixel values of the left opening phase difference detecting pixels 23L and the right opening phase difference detecting pixels 23R are interpolated by using the pixel values obtained in the peripheral normal pixels 23a, the interpolation of the pixel values of the phase difference detecting pixels 23p is performed by using the pixel values of the normal pixels 23a adjacent in the horizontal direction or the vertical direction in which the left opening phase difference detecting pixels 23L and the right opening phase difference detecting pixels 23R are nonuniformly arranged. Similarly, when the pixel values of the upper opening phase difference detecting pixels 23T and the lower opening phase difference detecting pixels 23B are interpolated by using the pixel values obtained in the peripheral normal pixels 23a, the interpolation of the pixel values of the phase difference detecting pixels 23p is performed by using the pixel values of the normal pixels 23a adjacent in the horizontal direction or the vertical direction in which the upper opening phase difference detecting pixels 23T and the lower opening phase difference detecting pixels 23B are nonuniformly arranged.

Calculating methods of the pixel values in the interpolation are variously considered. In the above description with reference to FIG. 7A to FIG. 12C, the case where one of the vertical normal pixel 23a and the horizontal normal pixel

23a of the phase difference detecting pixel 23p that is an interpolation object is used has been described as an example, but weighting may be varied by using both of the vertical normal pixel 23a and the horizontal normal pixel 23a.

For example, as shown in FIG. 13A, there is considered a case where the pixel value of the right opening phase difference detecting pixel 23R is interpolated on the basis of pixel values of peripheral G pixels. The pixel value of the upper G pixel adjacent to the right opening phase difference detecting pixel 23R is defined as G1, the pixel value of the lower adjacent G pixel is defined as G2, the pixel value of the left adjacent G pixel is defined as G3, and the pixel value of the right adjacent G pixel is defined as G4. When the arrangement of the phase difference detecting pixels 23p is the arrangement shown in FIG. 2, the right opening phase difference detecting pixels 23R are nonuniformly arranged in the column direction, and hence the pixel values of the upper and lower normal pixels 23a are used. Therefore, an interpolated pixel value I is given by, for example, $I=(G1+G2)/2$.

In addition, the interpolated pixel value I may be given by, for example, $I=(K1G1+K1G2+K2G3+K2G4)/(K1+K1+K2+K2)$, in which K1 and K2 are weight coefficients, and K1>K2. Additionally, it can be considered that $I=(G1+G2)/2$ represents a case where K1=1 and K2=0.

Similarly, for example, as shown in FIG. 13B, there is considered a case where the pixel value of the upper opening phase difference detecting pixel 23T is interpolated on the basis of pixel values of peripheral B pixels. The pixel value of the left B pixel adjacent to the upper opening phase difference detecting pixel 23T is defined as B1, the pixel value of the right adjacent B pixel is defined as B2, the pixel value of the upper adjacent B pixel is defined as B3, and the pixel value of the lower adjacent B pixel is defined as B4. When the arrangement of the phase difference detecting pixels 23p is the arrangement shown in FIG. 2, the upper opening phase difference detecting pixels 23T are nonuniformly arranged in the line direction, and hence the pixel values of the right and left normal pixels 23a are used. Therefore, the interpolated pixel value I is given by, for example, $I=(B1+B2)/2$.

In addition, the interpolated pixel value I may be given by, for example, $I=(K3B1+K3B2+K4B3+K4B4)/(K3+K3+K4+K4)$, in which K3 and K4 are weight coefficients, and K3>K4.

The weight coefficients K1, K2, K3 and K4 mentioned above are determined in advance and, for example, the same weight coefficients are always used. That is, the arrangement of the phase difference detecting pixels 23p in the imaging element 23 is fixed, and hence optimum weight coefficients are obtained in advance on the basis of the arrangement or the like. The interpolation is performed by using these weight coefficients, so that optimum interpolation can be realized.

The arrangement of the phase difference detecting pixels 23p in the imaging element 23, a positional relation between the phase difference detecting pixel 23p to be interpolated and the normal pixel 23a for use in the interpolation in the case where the pixel interpolation is performed, and information such as the weight coefficient are beforehand recorded in, for example, the ROM 43. In this way, for example, the ROM 43 functions as a memory section in which the arrangement of functional pixels in the imaging element is recorded.

It is to be noted that the calculating method of the pixel value I is not limited to the averaging. Although in the calculation of the pixel value I, the value cannot be utilized as it is for the image, the pixel value is also acquired in the phase difference detecting pixel 23p, and hence the pixel value acquired in the phase difference detecting pixel 23p to be interpolated may be used. That is, the above description is not limited to the case where the pixel value of the phase difference detecting pixel 23p is not used, and is also applicable to a case where the pixel value of the phase difference detecting pixel 23p is used. In this way, when the interpolation is considered, there are included not only the case where the pixel value is determined by the pixel values of the other pixels without using the pixel value of the phase difference detecting pixel 23p but also the case where the pixel value of the phase difference detecting pixel 23p is used.

When the direction in which the phase difference detecting pixels are arranged at nonuniform intervals is defined as a first direction, firstly, the first direction is acquired in the pixel interpolation. Subsequently, when weighting in the first direction is defined as a first weight and weighting in a direction different from the first direction is defined as a second weight, the first weight and the second weight are determined. Here, the first weight is larger than the second weight. Afterward, the interpolation processing is performed by using the first weight and the second weight.

According to the present embodiment, also in the pixel interpolation including pixel interpolation required when the phase difference detecting pixels 23p are disposed on an imaging surface of the imaging element 23, the deterioration of the image quality is prevented. Additionally, for example, as compared with such a case where a parameter for use in interpolation is adaptively changed in accordance with the pixel value of the periphery of the phase difference detecting pixel 23p to inhibit the image quality deterioration, or the like, according to the present embodiment, a circuit scale can be decreased and power consumption can be decreased as well. This is effective especially during the moving image recording or live view display.

It is to be noted that in the abovementioned example, as shown in FIG. 6A and FIG. 6B, the interval between the phase difference detecting pixels 23p in the direction in which the pixels are uniformly arranged is four pixels. When the interval is four pixels or more, an influence of crinkling easily occurs, and hence the present embodiment is especially effective when the interval is four pixels or more.

It is to be noted that in the abovementioned example, there has been described the example where the pixel interpolation is performed by using the pixel values of the upper, lower, right and left normal pixels 23a of the phase difference detecting pixel 23p, but the pixel interpolation may be performed by using the pixel value of the normal pixel 23a disposed in another direction. Also in this case, the weight is set to be large in the direction in which the phase difference detecting pixels 23p are arranged at nonuniform intervals, and the weight in another direction is set to be small, so that the deterioration of the image quality is prevented.

[First Modification]

A modification of the abovementioned embodiment will be described. Here, a different respect from the abovementioned embodiment is described, and the same components are denoted with the same reference signs to omit their descriptions. In the abovementioned embodiment, the example where the pixel value of the phase difference detecting pixel is interpolated has been described. However, an object whose pixel value is to be interpolated is not limited to the phase difference detecting pixel, and the abovementioned embodiment is applicable when a pixel having a function other than imaging needs to be disposed and interpolated in an imaging element. It is considered that, for example, a pixel for photometry is disposed as the pixel having the function other than the imaging. The pixel having the function other than the imaging in this way is referred to as a functional pixel.

Figure 14:
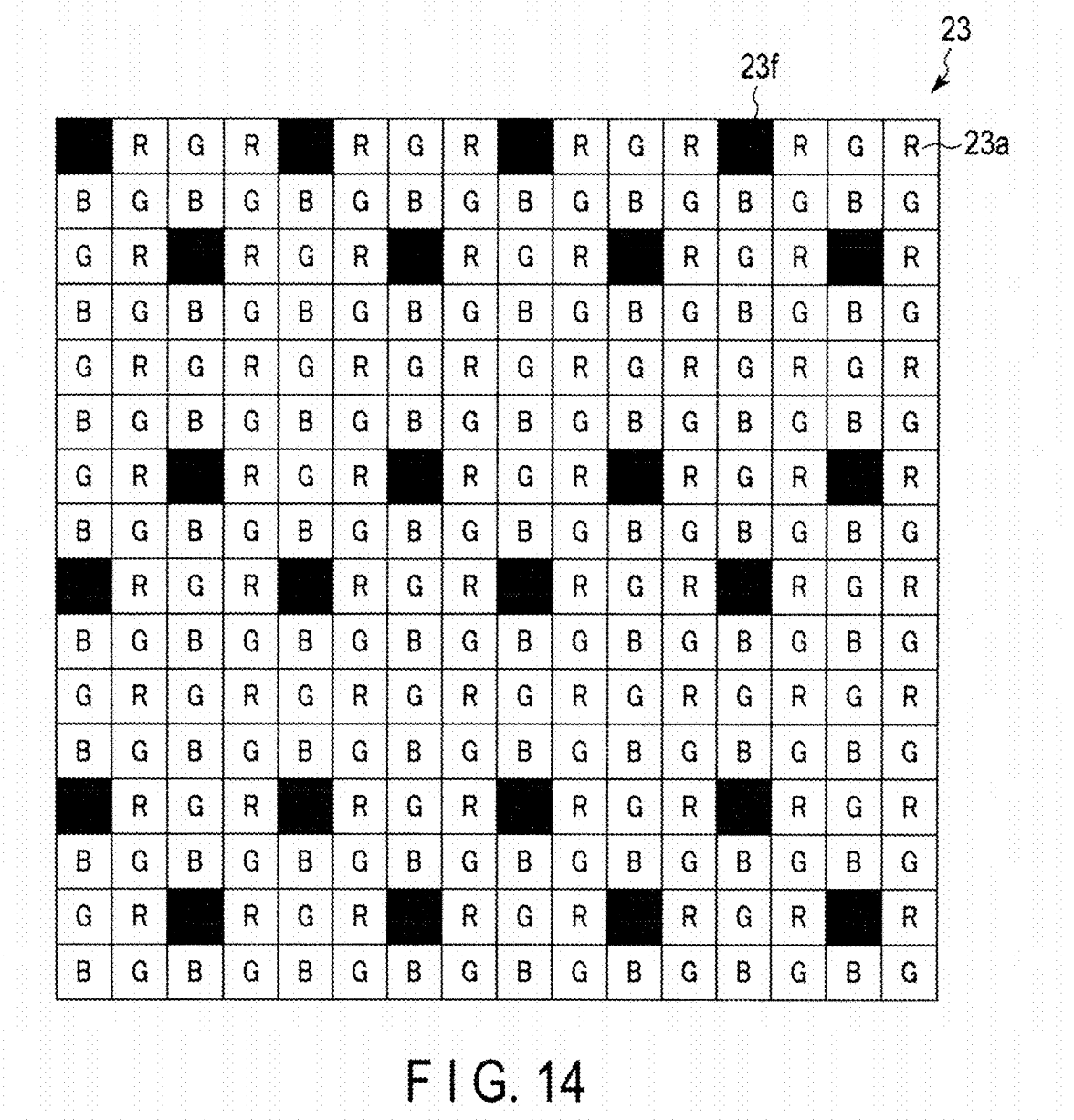

FIG. 14 shows an arrangement example of the functional pixels. As shown in FIG. 14, functional pixels 23f having the function other than the imaging are disposed in the blackened pixels. The functional pixels 23f cannot acquire image data, and hence the pixel values of the functional pixels 23f need to be interpolated by using pixel values obtained by peripheral normal pixels 23a. Therefore, the abovementioned embodiment is applicable.

In the example of the pixel arrangement shown in FIG. 14, the functional pixels 23f are uniformly arranged in a horizontal direction, and nonuniformly arranged in a vertical direction. Therefore, as to the interpolation, the interpolation may be performed by applying a larger weight to each of pixel values of pixels arranged in a vertical direction than to each of pixel values of pixels arranged in the horizontal direction. When such weighting is applied, deterioration of an image quality due to the interpolation is inhibited.

[Second Modification]

Figure 15A:
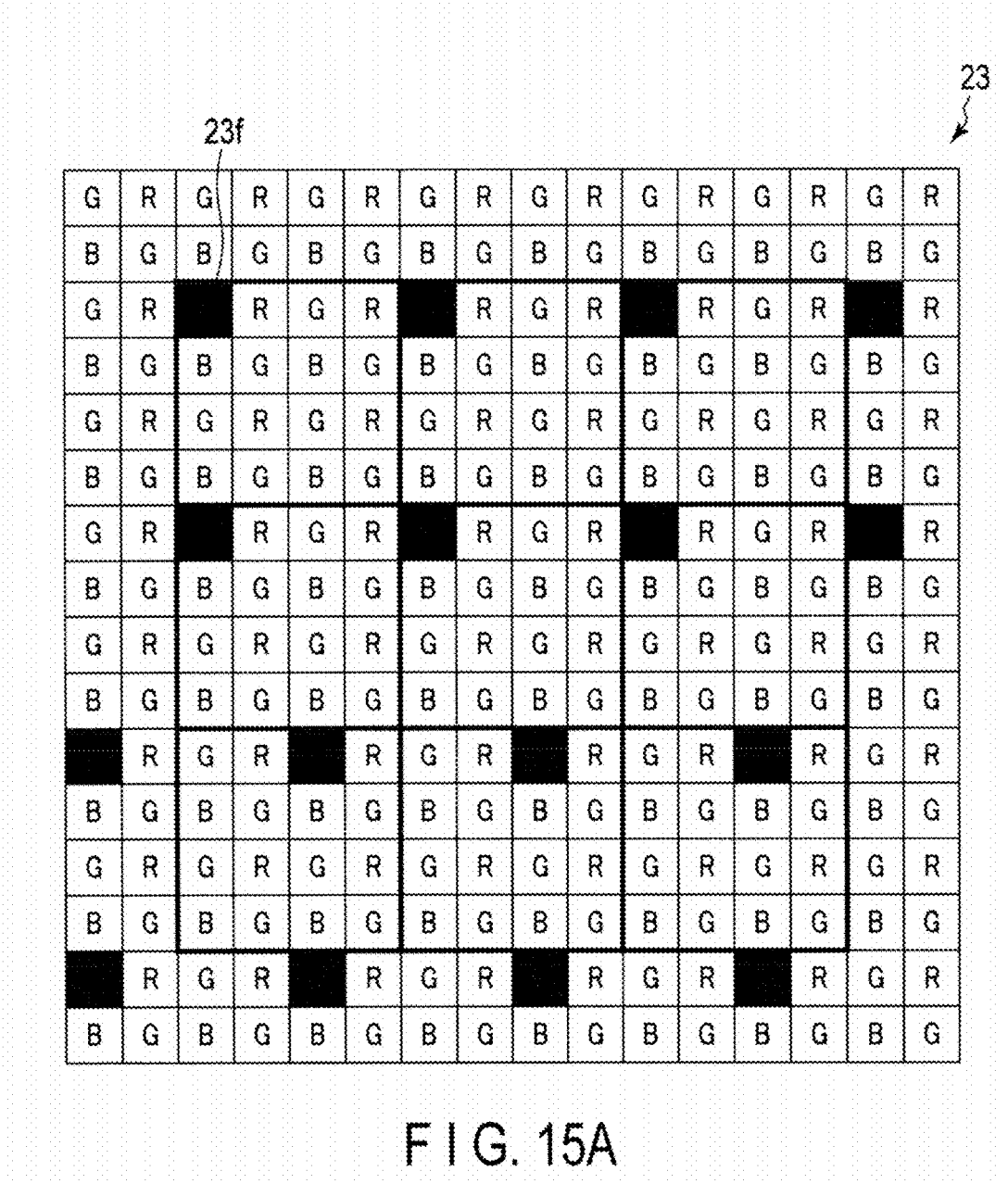
Figure 15B:
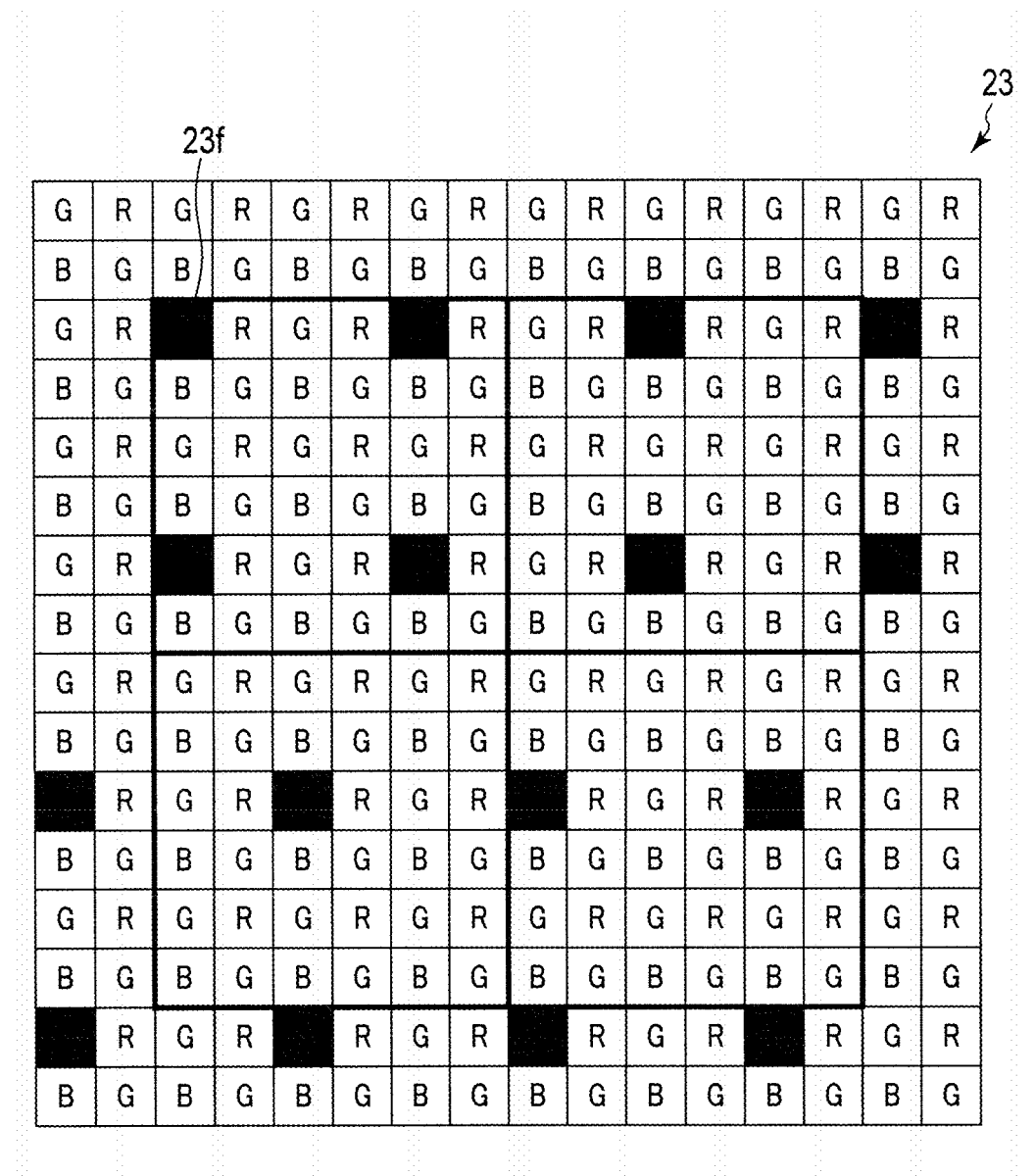

A modification of the abovementioned embodiment will be described. Here, a different aspect from the abovementioned embodiment is described, and the same components are denoted with the same reference signs to omit their descriptions. In the present modification, a case where pixel addition is performed is considered. There will be described an example of an imaging element 23 in which functional pixels 23f are arranged in such a manner as in FIG. 6A showing an arrangement of right opening phase difference detecting pixels 23R and left opening phase difference detecting pixels 23L. There is considered a case where four pixels of Gr, R, B and Gb are arranged and two vertical pixels and two horizontal pixels are defined as one set to perform the pixel addition. FIG. 15A shows one example of a positional relation of the pixels in this case. In FIG. 15A, each bold line shows one set of pixels to be subjected to the pixel addition, and pixel values of the same color in a frame shown by the bold line are added. Similarly, FIG. 15B shows one example of a positional relation of pixels in a case where four pixels of Gr, R, B and Gb are arranged and three vertical pixels and three horizontal pixels are defined as one set to perform the pixel addition. In FIG. 15B, each bold line shows one set of pixels to be subjected to the pixel addition, and pixel values of the pixels of the same color in a frame shown by the bold line are added. The number of the pixels to be included in the one set to be subjected to the pixel addition can be changed in accordance with an imaging mode.

As apparent from FIG. 15A, when one set of 2×2 is defined to perform the pixel addition, each set of the pixels includes one functional pixel 23f. This is because an interval between the functional pixels 23f is four pixels, and pixels to be included in the one set are four pixels×four pixels. On the other hand, as shown in FIG. 15B, when one set of 3×3 is defined to perform the pixel addition, the number of the functional pixels 23f to be included in the one set of pixels is one, two, or four. Depending on a combination of ranges to be subjected to the pixel addition, the number of the functional pixels 23f to be included in the one set can be three. In this way, when the number of the pixels to be subjected to the pixel addition varies, the number of the functional pixels 23f to be included in the one set of pixels can vary.

When the number of the functional pixels 23f to be included in the one set of pixels to be subjected to the pixel addition varies, an influence of the interpolation of the pixel value of the functional pixel 23f on the result of the pixel addition of the one set of pixels varies with each set, the interpolation being carried out by use of the pixel values of the peripheral normal pixels 23a.

Thus, in the present modification, for example, the weight coefficients K1, K2, K3 and K4 mentioned above are set to different values in accordance with the number of the pixels to be added. That is, in the interpolation of the functional pixel 23f, the following processing is performed. First, the number of the pixels to be added is determined. On the basis of the determination result, a parameter concerned with the interpolation of the functional pixel 23f, e.g., a weight coefficient is determined. The pixel interpolation is performed by using the determined parameter.

According to the present modification, in the pixel addition, the pixel value of the functional pixel 23f is most suitably interpolated in accordance with the number of the pixels to be added. As a result, deterioration of an image quality due to the interpolation is inhibited.

It is to be noted that a direction in which the functional pixels 23f to be interpolated are arranged at nonuniform intervals is defined as a first direction. In this case, when the number of the pixels in the first direction in one set of pixels that are addition objects in the pixel addition is smaller than an interval between the functional pixels 23f in the first direction, crinkling easily occurs in an image due to the interpolation. Therefore, when the number of the pixels in the first direction of the one set of pixels is smaller than the interval between the functional pixels 23f in the first direction, setting a weight coefficient K1 and a weight coefficient K2 to different values is especially effective.

In such interpolation processing as described above, when a density of the functional pixels is low, the interpolation may be performed after the pixel addition. When the functional pixels are densely arranged, one set of pixels to be subjected to the pixel addition necessarily includes one or more functional pixels. Therefore, when the density of the functional pixels is high, the interpolation of the pixel value of the functional pixel is preferably performed prior to the pixel addition.

It is to be noted that in the abovementioned embodiments and modifications, a case where a Bayer array is used has been described as an example. However, the present invention is not limited to the Bayer array, and when there are a direction in which the functional pixels are uniformly arranged and a direction in which the functional pixels are nonuniformly arranged, the abovementioned technology is applicable. Therefore, the present invention is not limited to the horizontal direction or the vertical direction, and is applicable to various directions such as an oblique direction and the like.

As described above, an object of the present technology is a case where an imaging element includes imaging normal pixels and functional pixels having a function other than imaging, and the functional pixels are arranged at nonuniform intervals in a first direction. In this case, when the pixel value of each functional pixel is interpolated with the pixel values of the peripheral normal pixels, a weight to be applied to the pixel value of each normal pixel disposed in the first direction is increased, and a weight to be applied to the normal pixel disposed in a direction other than the first direction is decreased. In this case, the pixel interpolation in which the deterioration of the image quality is inhibited can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    an imaging element including pixels which are two-dimensionally arranged, the pixels including normal pixels for imaging and functional pixels having a function other than the imaging, the functional pixels being arranged at nonuniform intervals in a first direction;
    a memory section in which an arrangement of the functional pixels in the imaging element is recorded;
    an interpolating direction determination section which acquires direction information concerning the first direction based on the arrangement of the functional pixels acquired from the memory section;
    a weight calculating section which calculates a first weight and a second weight based on the arrangement of the functional pixels acquired from the memory section, the first weight being a weighting amount in the first direction, the second weight being at least one weighting amount in a direction different from the first direction, and the second weight being smaller than the first weight; and
    an interpolation processing section which performs pixel interpolation to interpolate a pixel value of each of the functional pixels based on pixel values obtained by the peripheral normal pixels of the functional pixel concerning image data obtained in the imaging element where the first weight is applied to the pixel value obtained by each of the normal pixels arranged in the first direction and the second weight is applied to the pixel value obtained by each of the normal pixels arranged in the direction different from the first direction.

2. The imaging device according to claim 1, wherein the functional pixels are phase difference detecting pixels for focus detection.

3. The imaging device according to claim 2, wherein
    the interpolating direction determination section acquires the direction information concerning the first direction corresponding to each type of color filter disposed in the imaging element, and
    the weight calculating section calculates the first weight and the second weight by use of the direction information.

4. The imaging device according to claim 3, wherein the weight calculating section calculates the first weight and the second weight in accordance with the number of the pixels to be included in one set that is an addition object, in a case where pixel addition is performed in accordance with an imaging mode during image acquisition using the imaging element.

5. The imaging device according to claim 2, wherein the weight calculating section calculates the first weight and the second weight in accordance with the number of the pixels to be included in one set that is an addition object, in a case where pixel addition is performed in accordance with an imaging mode during image acquisition using the imaging element.

6. The imaging device according to claim 1, wherein an interval between the functional pixels in the first direction is four pixels or more.

7. The imaging device according to claim 1, wherein the weight calculating section calculates the first weight and the second weight, when the number of the pixels in the first direction concerning the pixels to be included in one set that is an addition object is smaller than an interval between the functional pixels in the first direction, in a case where pixel addition is performed in accordance with an imaging mode during image acquisition using the imaging element.

8. The imaging device according to claim 1, wherein the second weight is not zero.

9. An image processing method to be applied to image data obtained by using an imaging element including pixels which are two-dimensionally arranged, the pixels including normal pixels for imaging and functional pixels having a function other than the imaging, the functional pixels being arranged at nonuniform intervals in a first direction, the method comprising:
    acquiring direction information concerning the first direction based on an arrangement of the functional pixels acquired from a memory section in which the arrangement of the functional pixels in the imaging element is recorded;
    calculating a first weight and a second weight based on the arrangement of the functional pixels acquired from the memory section, the first weight being a weighting amount in the first direction, the second weight being at least one weighting amount in a direction different from the first direction, and the second weight being smaller than the first weight; and
    performing pixel interpolation to interpolate a pixel value of each of the functional pixels based on pixel values obtained by the peripheral normal pixels of the functional pixel concerning image data obtained in the imaging element where the first weight is applied to the pixel value obtained by each of the normal pixels arranged in the first direction and the second weight is applied to the pixel value obtained by each of the normal pixels arranged in the direction different from the first direction.

* * * * *